Fig. 2C  FIRST CUT FROM LEADING EDGE
| TRIAL NO. | TRIAL Z | TRIAL S | AVAILABLE WIDTHS LARGER THAN ANY S | S FITS | ACCUMULATED VALUE | CHOSEN TRIAL |
|---|---|---|---|---|---|---|
| 1 | 35 | 7,15,29 | 16<br>15<br>9 | 1(15)<br>1(15)<br>1(7) | 37 | |
| 2 | 20 | 13,11,10 | 21<br>24<br>15 | 1(11),1(10)<br>1(13),1(11)<br>1(13) | 58 | ✓ |
| 3 | 9 | 8,6 | 21<br>24<br>15 | 3(6)<br>3(8)<br>1(8),1(6) | 56 | |
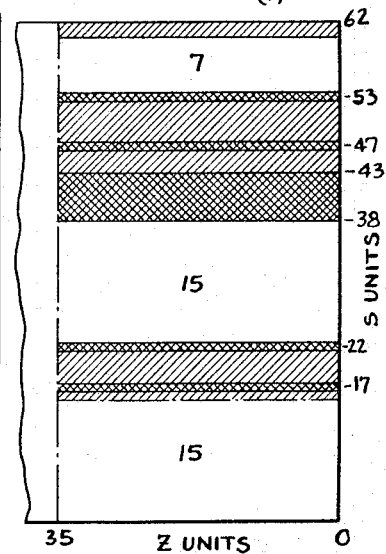
Fig. 2D  TRIAL Z CUT (1)
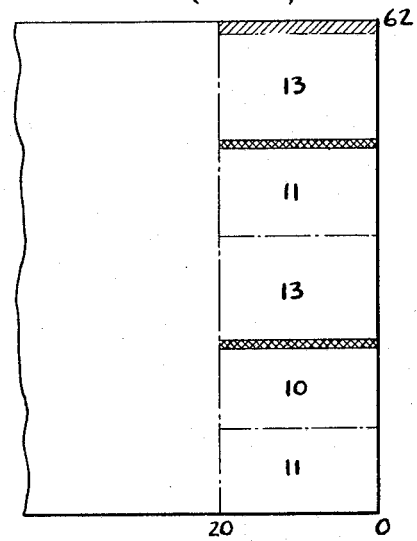
Fig. 2E  TRIAL Z CUT (2) (CHOSEN)
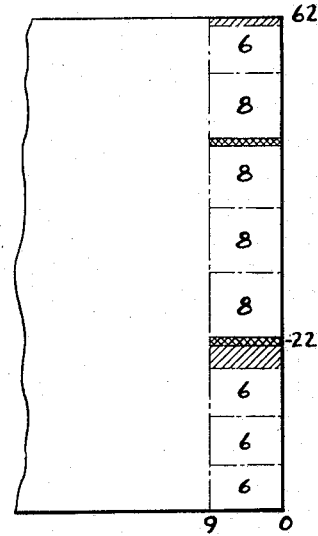
Fig. 2F  TRIAL Z CUT (3)

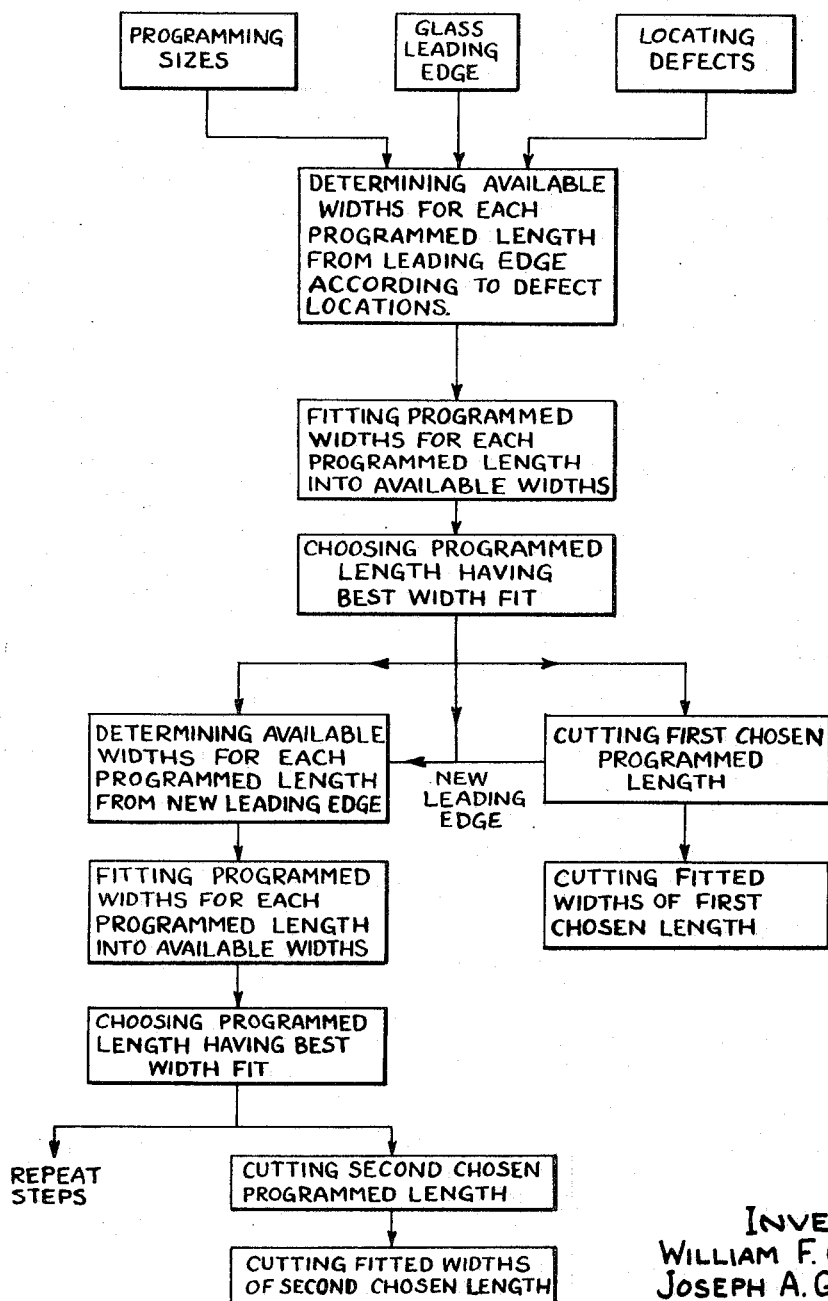

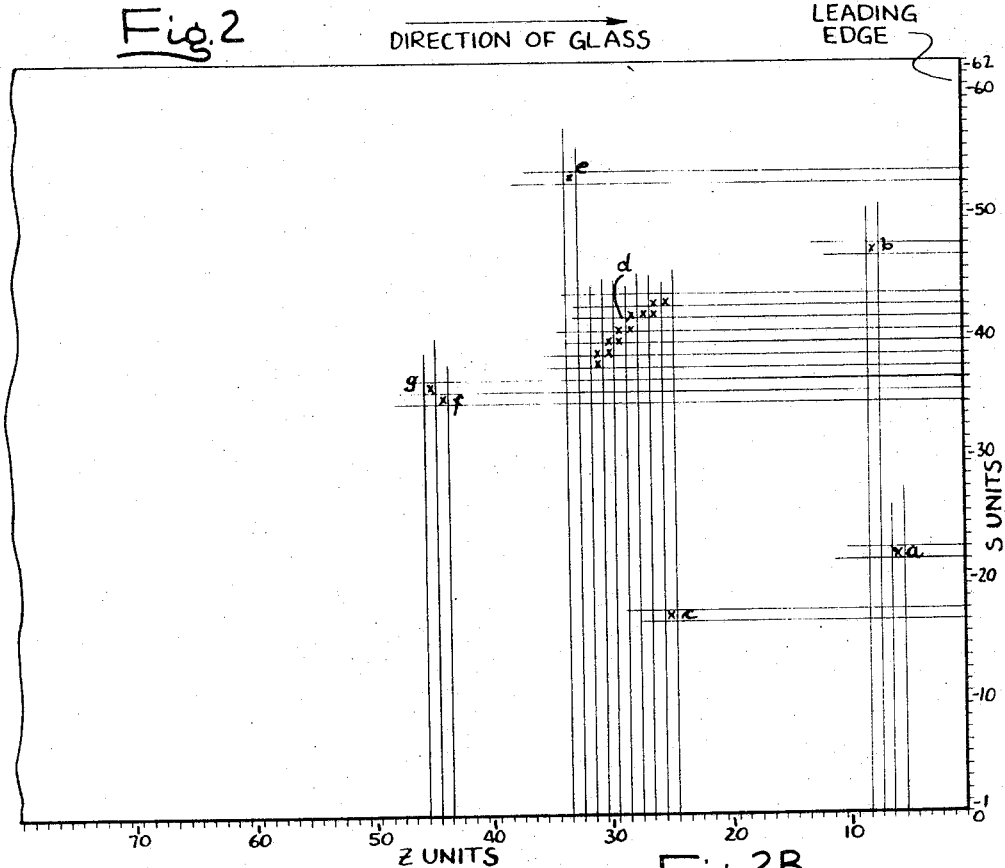

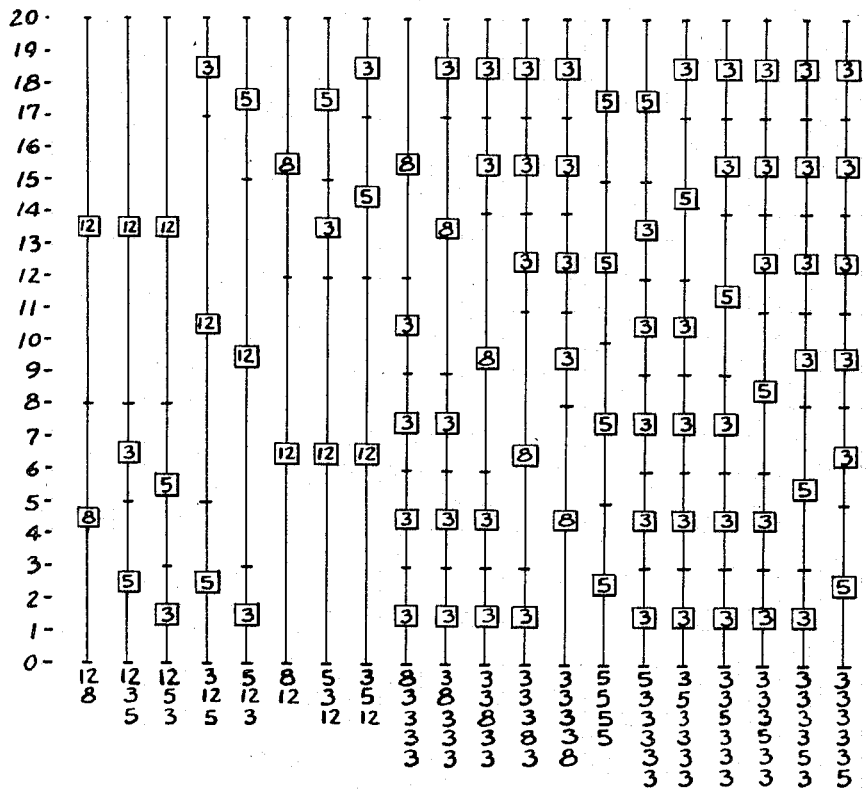

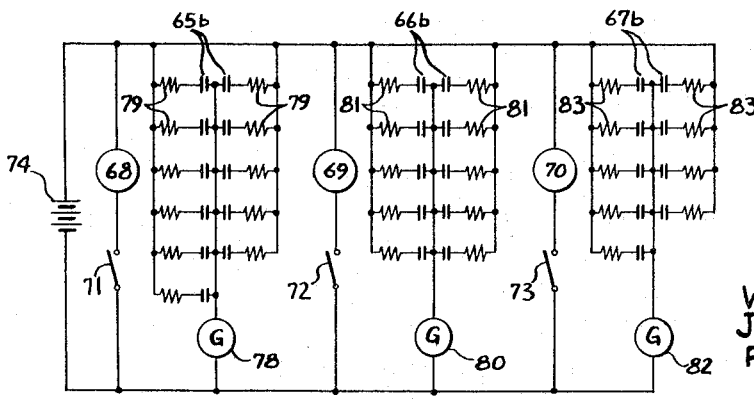

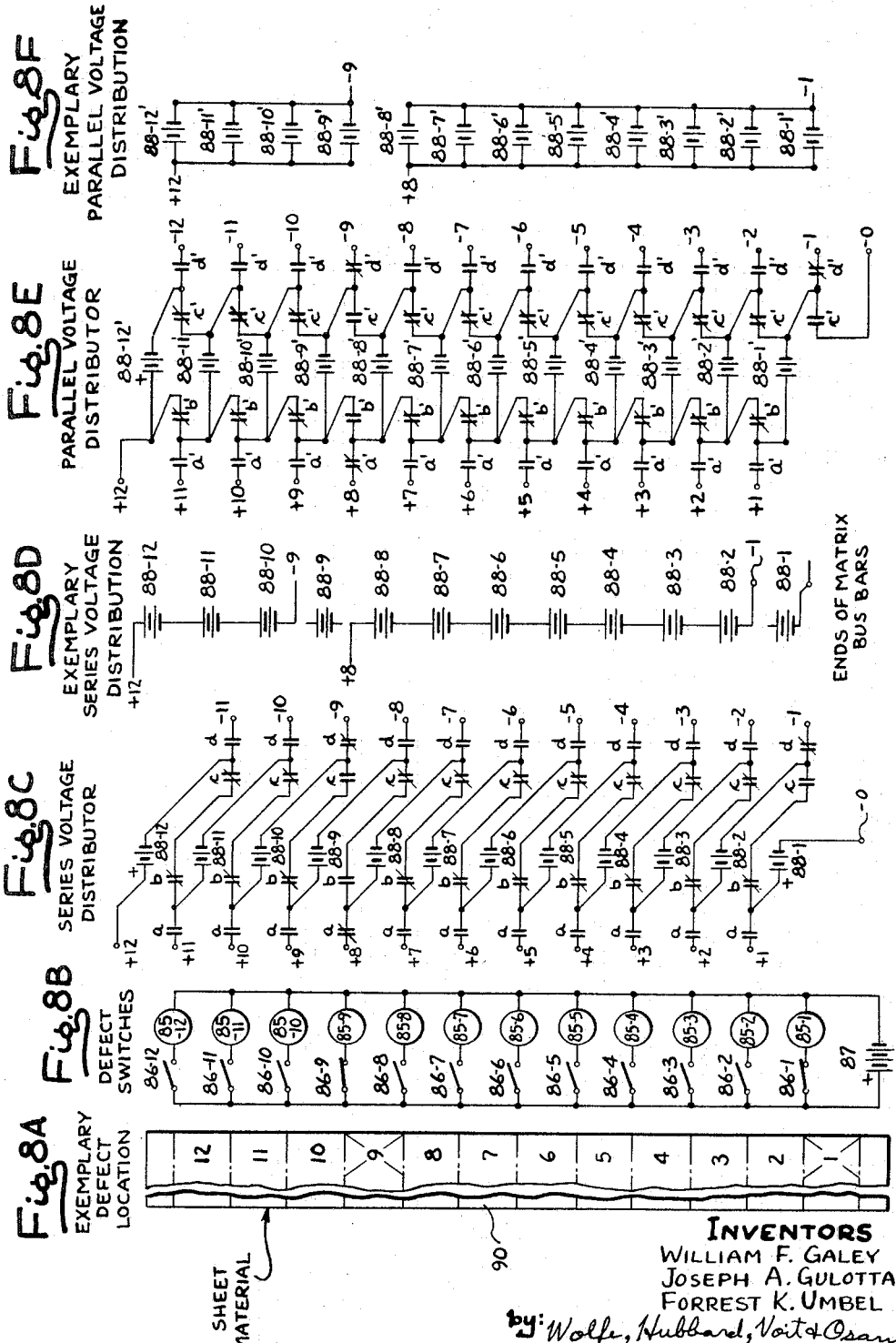

Jan. 24, 1967 W. F. GALEY ET AL 3,300,629
LENGTH AND AREA PARTITIONING METHODS AND APPARATUS
Original Filed Nov. 2, 1959 11 Sheets-Sheet 8
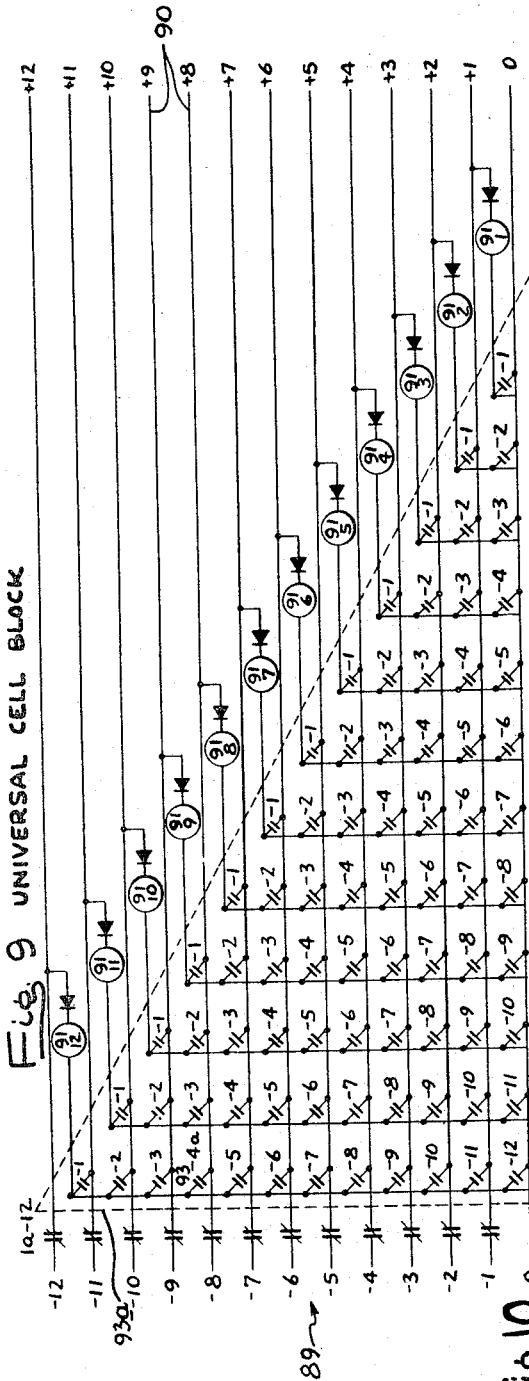
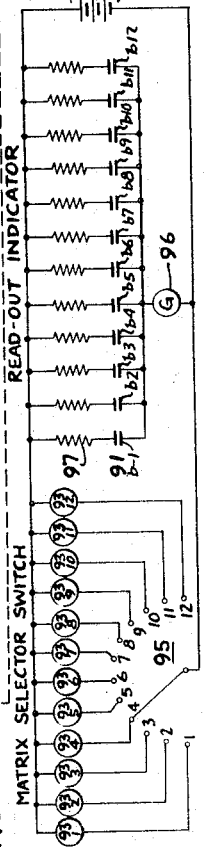
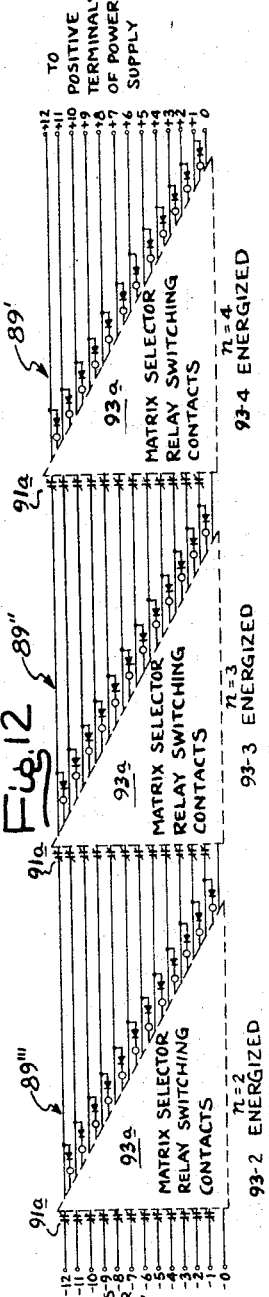
INVENTORS
WILLIAM F. GALEY
JOSEPH A. GULOTTA
FORREST K. UMBEL
by: Wolfe, Hubbard, Voit & Osann ATTYS INVENTORS
WILLIAM F. GALEY
JOSEPH A. GULOTTA
FORREST K. UMBEL
by: Wolfe, Hubbard, Voit & Osann
ATTYS.

Jan. 24, 1967 W. F. GALEY ET AL 3,300,629
LENGTH AND AREA PARTITIONING METHODS AND APPARATUS
Original Filed Nov. 2, 1959 11 Sheets-Sheet 11

INVENTORS
WILLIAM F. GALEY
JOSEPH A. GULOTTA
FORREST K. UMBEL
by: Wolfe, Hubbard, Voit & Osann ATTYS United States Patent Office 3,300,629
Patented Jan. 24, 1967

3,300,629
LENGTH AND AREA PARTITIONING METHODS
AND APPARATUS
William F. Galey, Saxonburg, Joseph A. Gulotta, New
Kensington, and Forrest K. Umbel, Verona, Pa., assignors to Pittsburgh Plate Glass Company, Allegheny
County, Pa., a corporation of Pennsylvania
Original application Nov. 2, 1959, Ser. No. 850,360, now
Patent No. 3,246,550, dated Apr. 19, 1966. Divided
and this application Oct. 15, 1964, Ser. No. 411,958
15 Claims. (Cl. 235—185)

This application is a division of our copending application Serial No. 850,360, filed November 2, 1959, now Patent No. 3,246,550.

This invention relates to the fitting of given lengths or areas into given total lengths or areas, typically in terms of partitioning sheet material having random defect areas into predetermined defect-free sizes. It has particular reference to cutting plate glass into saleable sizes after inspection in a continuous glass manufacturing process.

Plate glass, as a sheet material, is presented for inspection after it has been ground, polished and washed, and prior to cutting it into various marketable sizes. The glass is subject to defects of various types and unpredictable size and location which may make cut sheets containing the defect areas totally unusable or which may affect the quality grading of saleable sheets. In fitting or piecing out different combinations of the various sizes from the usable areas it is desired, of course, to throw away or downgrade as little as is necessary of the glass which is free of defects of a severity affecting the glass grade being cut. Time and timing are always of concern since the operation is an adjunct of high production manufacture in which glass of given width, either as large separate sheets, or sometimes as an unbroken ribbon, moves at a continuous rate as it is formed and finished.

Efficiency goals in laying out the grade-defined defect-free area of the total glass output into usable sizes have in fact been limited by the number of factors which skilled layout men have found it practical to consider. The possible factors are many. For example, a large number of predetermined sizes are marketable and more than one saleable grade may also be involved. Inspection is required for the total output since the defect distribution is not predictable. Relative preference or demand for the various sizes may also be factors. The demand for particular sizes may change in accordance with the quantities which have already been cut. Obviously, the number of choices of possible glass sizes which must be evaluated before a cut is made is very large if all of the factors or choices are considered.

Human judgment under such conditions is often intuitive at best, making it at least difficult, and always more expensive, to reach decisions quicker by multiplying manpower. Yet complex problems usually require time for their full solution, and the economies of manufacture make the cost of the time involved part of the definition of the least wasteful cutting decision. In the interests of reducing storage and handling of the glass produced before shipping, close control of elapsed time is also involved. Desirably the sequence of inspection for defects, the presentation of all the relevant data, the making of economic cutting decisions, the actual cutting, and the routing of the cut glass sizes to respective packing stations, is an essentially on-line procedure. The present invention makes this possible.

It is, therefore, a principal object of the invention to provide methods and apparatus for making intelligently the decisions involved in cutting a large sheet into desired smaller sizes. Stated in another way, it is an object of the invention to provide methods and apparatus for correlating all supplied data on specific defect locations in a sheet to be cut on the one hand, and on desired sizes on the other hand, to reach timely, systematic, and economic cutting decisions without resort to human judgment. Another object is to provide a method and means for systematically employing defect location data and trial dimensions in laying out defect-free rectangles.

It is an object to provide a computer for automatically relating defect data and demand data in reaching cutting decisions for sheet material such as plate glass.

It is also an object to provide computer circuits for quickly and reliably determining choices available and selecting the best choice according to a programmed logic. Further, it is an object to provide a computer which is readily incorporated on a continuous glass production line.

Other objects include provision of methods and apparatus for converting the output of a plate glass factory into saleable glass sizes of maximum value or with minimum waste. It is also an objective to provide automatic means for determining both length and area partitions of any total length or area. A further objective is to provide apparatus for partitioning sheet glass which is relatively fast, simple, and inexpensive.

Summarizing, it is an objective to simultaneously remove defects, meet quantity and size demands, and reduce waste all within the bounds of new but economically available technology.

In addition to the partitioning of glass or other sheet materials, it will be appreciated that the lengths or area quantities are represented generally by integers to be partitioned into combinations of numbers representing members of a set of partitioning element numbers.

It is therefore a general object to provide methods and apparatus for partitioning.

Further, it is an object to provide means for determining either general or selective integral partitions for any integral quantity.

It is another object to provide digitally exact partitioning without resort to binary arithmetic systems.

It is also an object to provide means for computing partitions without requiring read-out of previously stored solutions.

In terms of computer apparatus, it is a further object to provide partitioning computers having logic circuits minimizing storage and programming of arithmetic steps. It is also an object to provide a computer apparatus operable at reasonable speeds with relatively simple and inexpensive electromagnetic switch components.

Other features, objects and advantages of the invention will become apparent from the following detailed description illustrated in the accompanying drawings in which:

FIGURE 1 outlines the steps of a two-cut logic in piecing out sheet material in accordance with the invention.

FIG. 2 is an example of a leading portion of a glass sheet with particular defect pattern located thereon.

FIG. 2A is a table of the defect pattern example locating the defective unit squares of FIG. 2.

FIG. 2B is a table of exemplary programmed sizes with rank and value to be cut from the glass sheet of FIG. 2.

FIG. 2C is a table illustrating the trial partitions of the sheet of FIG. 2 leading to choice of a particular set of cutting commands according to the programmed sizes of FIG. 2B.

FIGS. 2D, 2E, and 2F graphically portray the trial partitions that establish the table of FIG. 2C.

FIG. 3 is a graphical representation of a general solution to a partitioning problem.

FIG. 4 is a graphical representation of a selective solution to a partitioning problem.

Figure 5:
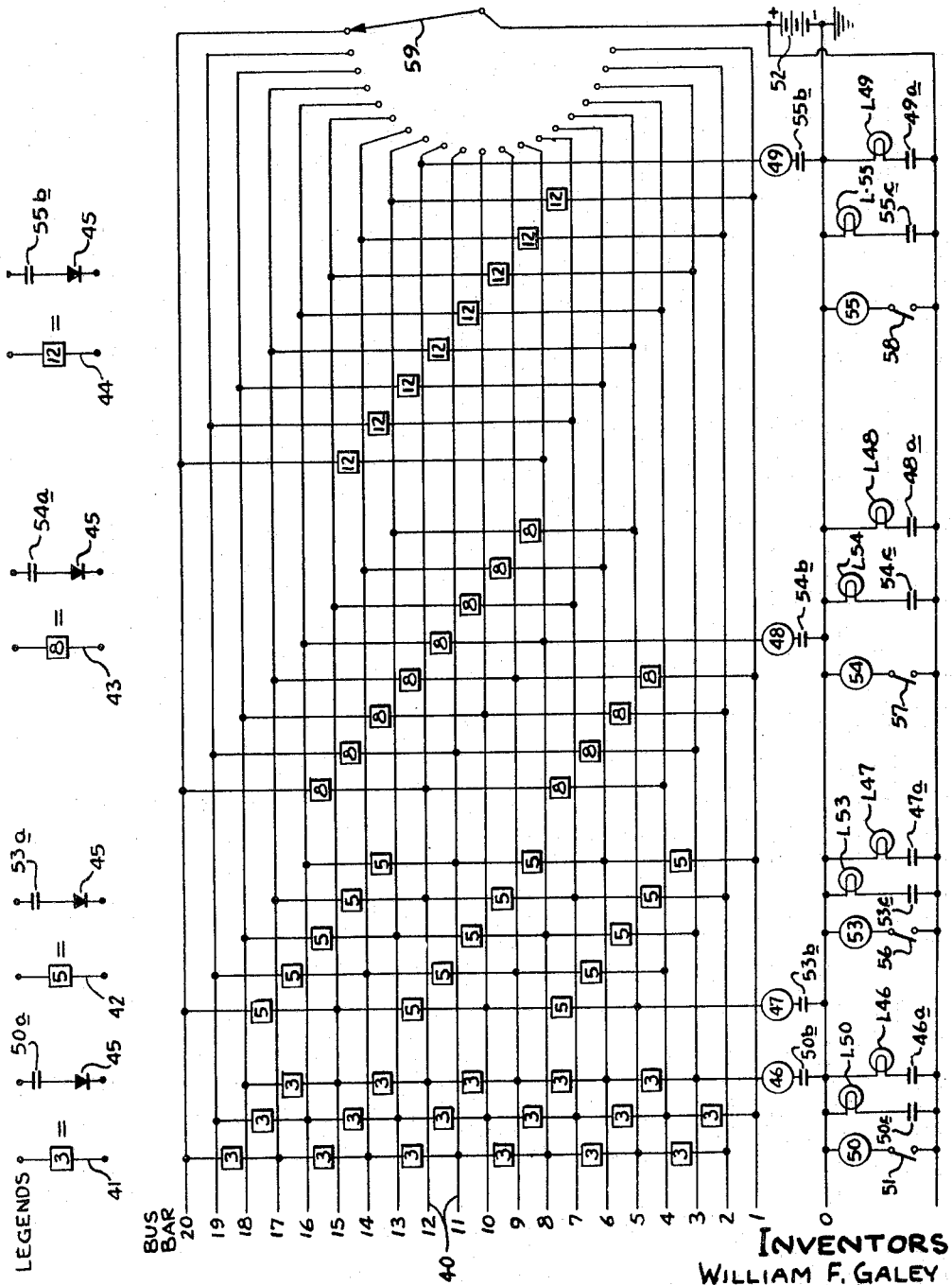

FIG. 5 illustrates an electrical permission matrix analog of the partitioning definition and example of FIG. 3.

FIG. 6 illustrates an electrical command matrix analog of the selective partitioning definition example of FIG. 4.

FIG. 7 is a circuit diagram of a size switch and read-out indicator circuit for the matrix of FIG. 6.

FIG. 8A represents a 12-unit length of a sheet bearing defects in the first and ninth units.

FIG. 8B is a diagram of a 12-unit defect relay circuit for reporting the defects of FIG. 8A.

FIG. 8C is a circuit diagram of a series-type voltage distributor operated by the defect relays of FIG. 8B for energizing the matrix of FIG. 6.

FIG. 8D represents the voltage connections to the matrix made by the series-type voltage distributor of FIG. 8C.

FIG. 8E is a circuit diagram of a parallel type voltage distributor operated by the defect relays of FIG. 8B for energizing the matrix of FIG. 6.

FIG. 8F represents the voltage connections to the matrix made by the voltage distributor of FIG. 8E.

FIG. 9 is a diagram of a universal cell block in a 12-span matrix like that of FIG. 6.

FIG. 10 is a diagram of the cell size selector switch and the read-out indicator for the matrix cell block of FIG. 9.

FIG. 11 illustrates the cell relay connection of each cell in the block of FIG. 9.

FIG. 12 graphically indicates the connection of 3 universal cell blocks shown in FIG. 9 as a selective matrix for $a_i$ integers of 4, 3, and 2 in that rank.

Figure 13:
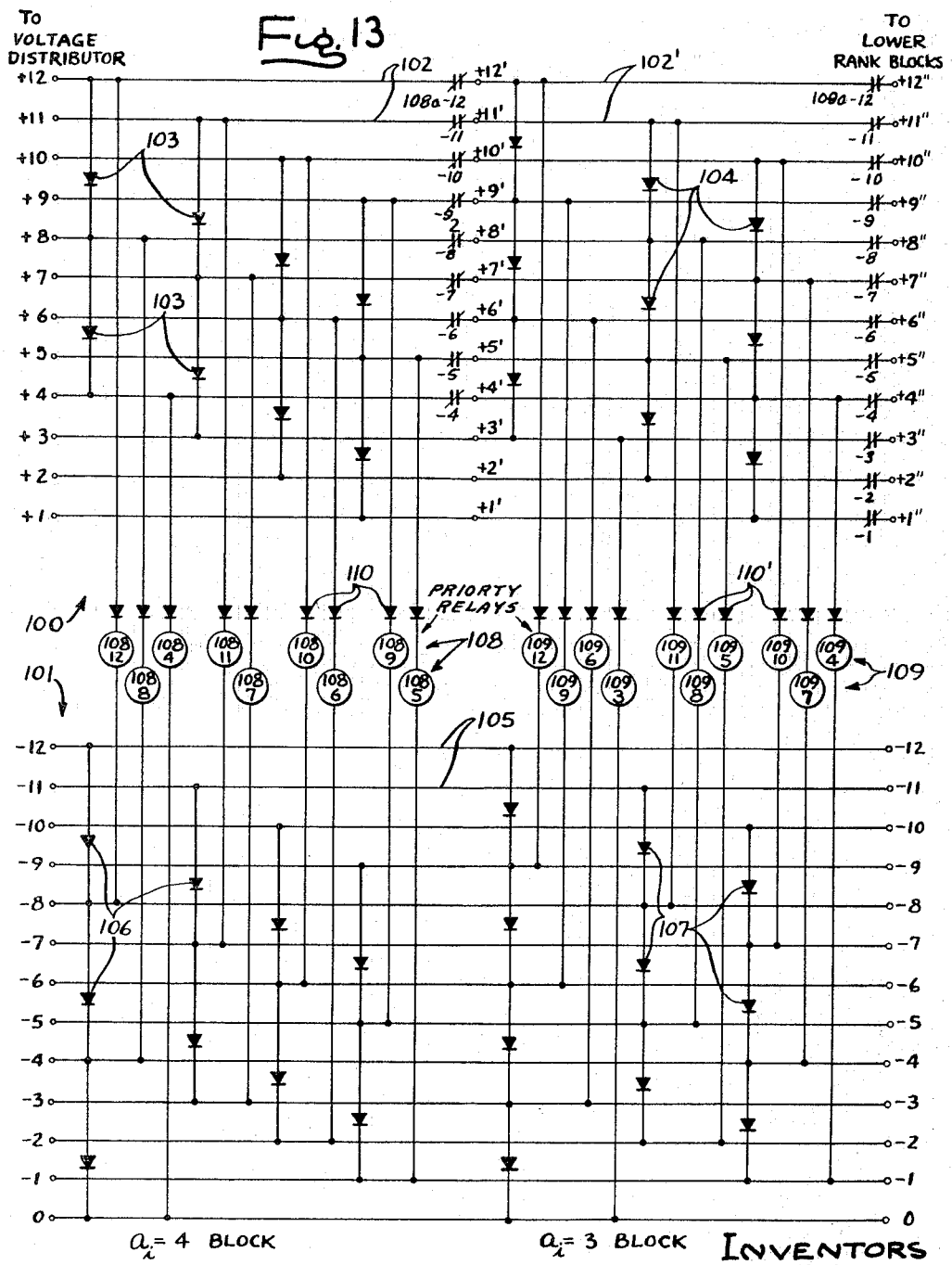

FIG. 13 illustrates the connection of two complementary cell blocks as a parallel return dual matrix for effectively applying rated coil voltage to all cell relays in partitioning current paths and with exemplary $a_i$ solutions of 4 and 3.

Figure 14:
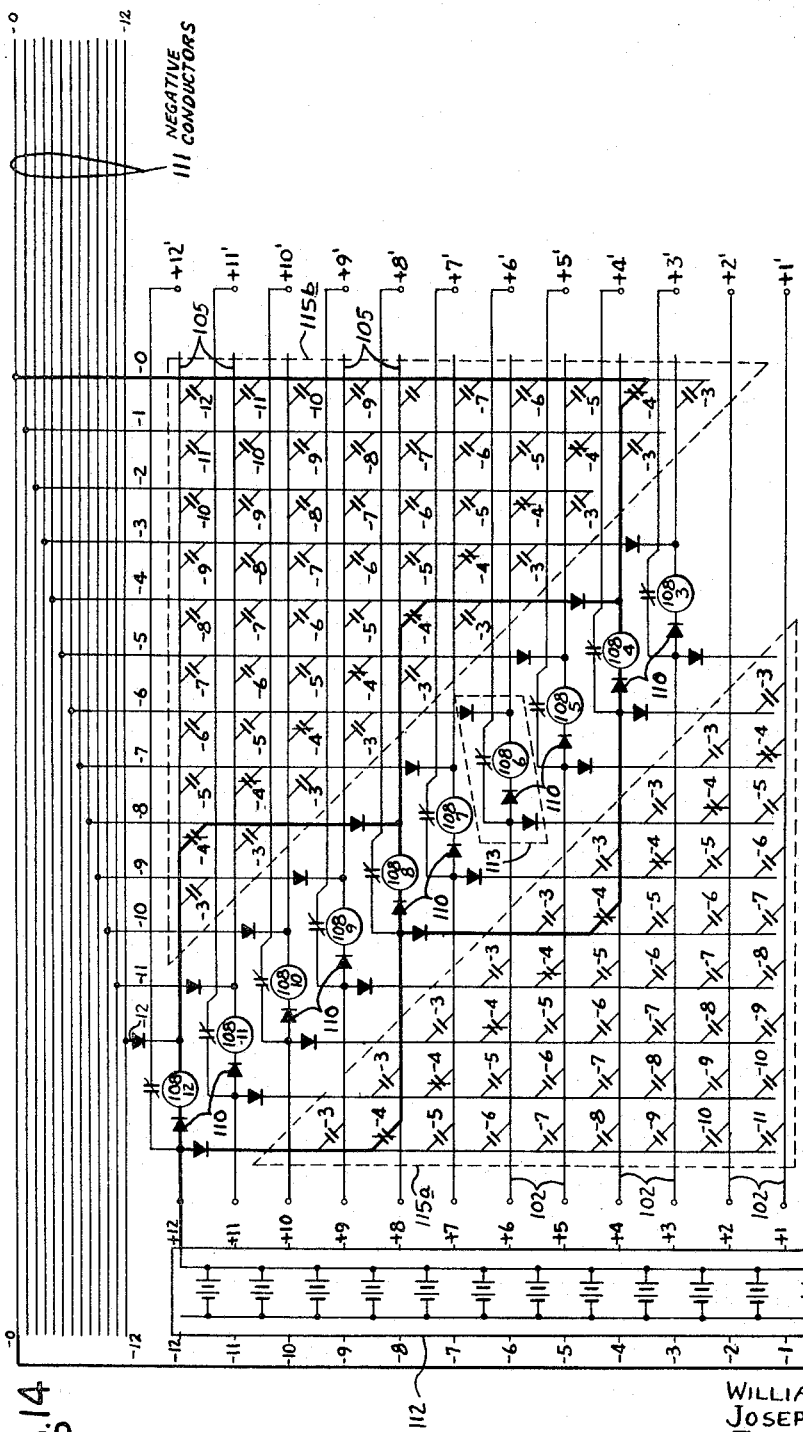

FIG. 14 illustrates a universal cell-block dual matrix as arranged for selection of integers of 3 through 12 and with an exemplary selection of $a_i=4$.

Figure 15:
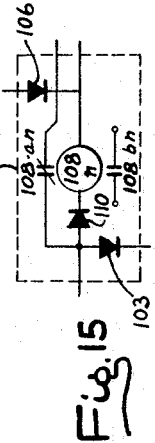

FIG. 15 illustrates one of the priority or read-out subassemblies of the FIG. 13 matrix.

Figure 16:
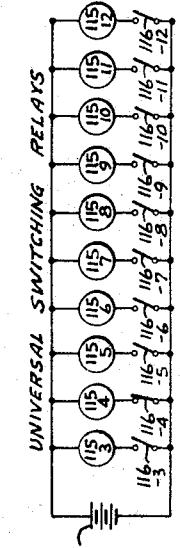

FIG. 16 illustrates a universal cell-block switch control circuit for the FIG. 14 matrix.

Figures 17, 18:
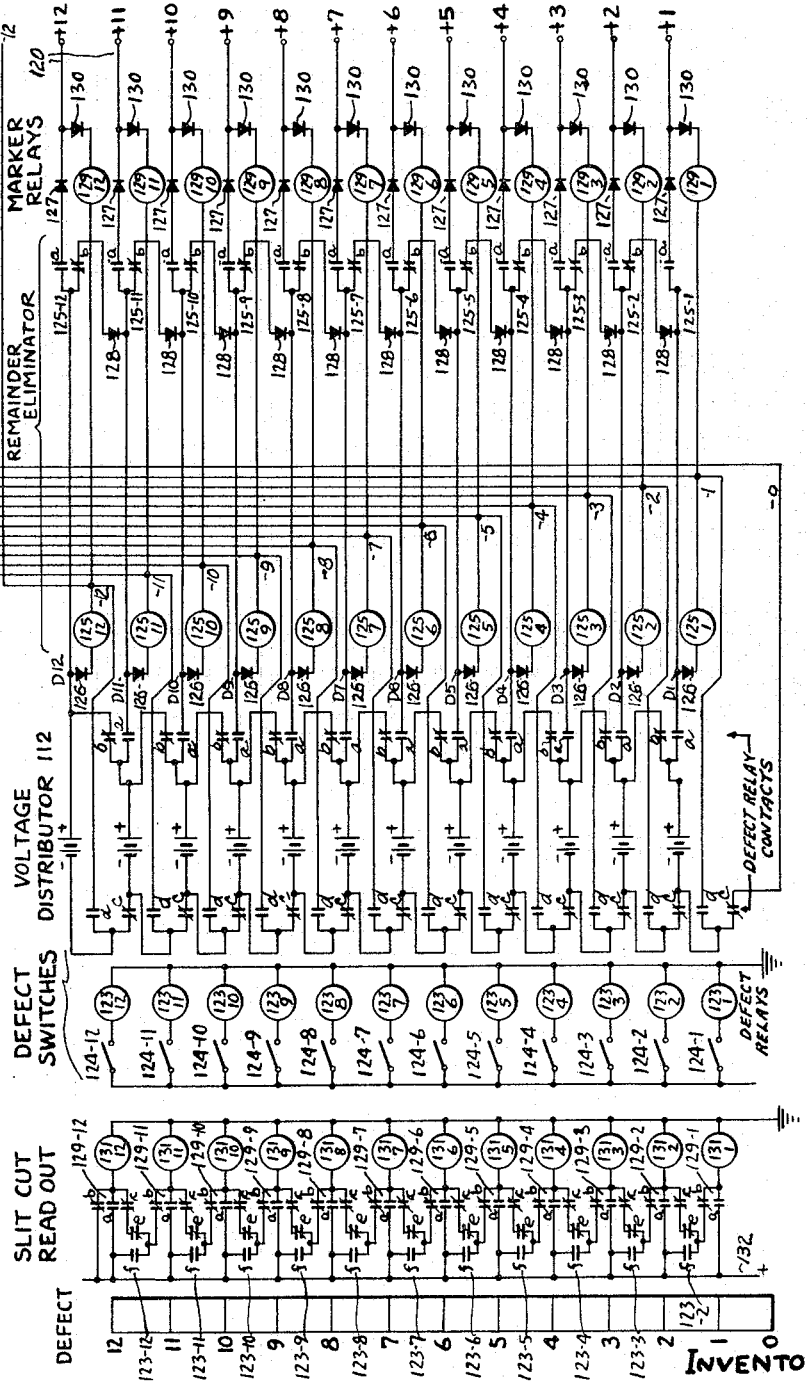

FIG. 17 represents the defect switches, voltage distributor, automatic programming, and marker circuits as incorporated in a system with the matrix of FIG. 14.

Although certain particular embodiments of the invention have been shown and described here in some detail there is no intention to hereby limit the invention to the specific forms or details illustrated. On the contrary, the invention is to cover all alternatives, modifications, and equivalents falling within the spirit and scope of the invention as expressed in the appended claims, and the specification has been organized to guide the reader to that end as concisely and clearly as the complexities of some of the described industrial embodiments permit.

For an over-all view and introduction, Section I presents both the general method involved and definitive analysis of partitioning as here employed. Section II introduces physical matrices as analogs of partitioning equations together with the construction and operation of several useful circuits for practicing the invention.

I. PRACTICING THE METHOD OF THE INVENTION

A. Area partitioning

The over-all method of area partitioning of sheet material in accordance with the invention involves what may be termed a two-cut logic. For a generalized representation of the method in terms of the steps involved, the reader is referred to FIG. 1 which relates to plate glass as the sheet material out of which defect-free prescribed sizes are to be pieced.

Preliminarily, in cutting plate glass as a sheet material, it should be noted that three basic cutting requirements are respected.

First, the sheet or continuous ribbon is to be partitioned into rectangles of prescheduled or programmed dimensions, as distinguished from an operation in which the defective area is merely cut out of the sheet or in which the largest available defect-free piece of sheet material is always cut. The scheduled sizes are typically very much larger than the rectangular defect-bearing remainders which must be discarded.

Second, each cut must run completely across a dimension of the glass piece involved. This cutting requirement is inherent in the nature of glass since the cutting process is one in which the glass is scored and snapped. The same condition is significant for other sheet materials to the extent that the time and apparatus expense associated with cuts of partial lengths or cuts which turn corners are unduly high.

Third, the piecing or partitioning must be selective so that the scrap is of minimum area consistent with the choice of sizes into which the defect-free glass can be partitioned. Since defect severity affects grading, it should be noted that a glass area may be defect-free as to one grade, but not as to another.

The glass sheet, as described in connection with an industrial apparatus embodiment may, for example, be quarter-inch plate produced as a continuous ribbon over ten feet wide at a rate in the vicinity of two hundred lineal inches per minute. A traverse or cross cut across the glass ribbon width is the first cut of each operation, here called the Z-cut, and a second of second cuts, here called S-cuts, slit or slice the cut-off Z piece into smaller widths and eliminates the defects. This is the two-cut logic; the manner in which it is advantageously and uniquely applied follows.

Returning now to FIG. 1, the information required in piecing out the glass is the location of the leading edge of the glass, the locations of the defects, and the program of sizes to be cut.

For locating the defects, various means may be employed, suitably either visual or photo-electric inspection of the glass sheet of the over-all area to be considered before the first cut is made. This information can be considered as stored directly in or on the glass, but may be more readily recalled by addition of marks or markers. Preferably, however, the defect is secondarily stored, as on a tape or other record containing the dimensional location of each defect square with respect to the leading edge and the side edge.

The total demand program includes both the absolute sizes and the relative demand for them as reflected by assigned values per size. As to the sizes themselves, the lengths and widths of the various rectangles to be cut are arranged to group the respective width dimensions sharing a common length dimension. All of the length dimensions are thus grouped, each associated with one or more width dimensions. The relative demand for the different length by width sizes is preferably determined in a two-part analysis. First, a rank or order of priority is established for the respective width dimensions associated with each length dimension and second, a numerical value is established for each size so that values of groups of sizes can be accumulated and compared.

In accordance with the two-cut logic, the trials for the first cut correspond to the different programmed lengths as measured from the leading edge of the glass. Thus for each programmed length a trial length of the glass sheet is considered for which either all or parts of the total ribbon width are available for partitioning as defect-free spans, depending upon the number and locations of the defects affecting the grade being considered. Each defect is contained in a defect strip as long as the programmed length being considered.

Next the programmed widths for that particular programmed length are fitted into the available widths according to an assigned rank. The waste, which includes unfitted portions of the defect-free widths as well as the defect strips themselves, is minimized by choosing the number and variety of programmed widths that best partition the available defect-free widths. For each programmed length and corresponding widths thus tried, the values of the programmed sizes utilized are accumulated as the value associated with that trial length or cross cut.

The steps of fitting the programmed widths into available defect-free widths and subsequent value accumulations, is repeated for each programmed length before any cutting decision is made. In effect, a number of trial first cuts across the width of the glass are made and by this logical process the cut for which the best fit is provided, i.e., that for which the value of the fitted programmed sizes is highest, is chosen. After the chosen cut determination has been made, commands for cutting that programmed length and subsequently cutting the fitted widths of that programmed chosen length are issued. A large number of programmed lengths or trial cross cuts may thus be considered and whether the first chosen cut is the smallest or the largest or an intermediate one of the programmed lengths depends upon the particular defects and cutting program. It will be recognized, of course, that as larger dimensioned cross cuts (i.e., programmed lengths) are considered, larger numbers of defects are probable. The values of larger sizes, however, may counterbalance the larger absolute waste per cut to provide in the long run the most efficient or least wasteful operation consistent with meeting production requirements.

After the location of the new leading edge is thus systematically determined the steps are repeated. Thus each programmed length is again considered but with respect to the new leading edge. The defect locations with respect to the leading edge are changed, of course, and the available widths are re-determined. After again fitting the programmed widths into the available widths for each programmed length and accumulating the value of the sizes which would be cut, the second programmed length representing the best value is selected as the second cross cut in the repeated procedure. The widths for that second cut are cut or slitted and the fitting procedure is initiated again with respect to the newly created leading edge. The process continues a decision at a time for the length of the sheet material. If the overall length dimension is very large, as when a continuous ribbon of sheet material is presented, the steps are continuously repeated.

Programming is usually established in terms of daily or weekly production, and a running count is desirably made of sizes cut but not ordinarily stocked in order that the program may be revised when the quantity requirements are met. The programming should, of course, be adjusted to take into account current economic factors and demands.

It may be pointed out that while the sequence is ordered, the actual time at which the cutting occurs may be deferred. Thus a sheet may be marked for the subsequent cutting of successive chosen lengths (with the accompanying fitted widths), each chosen length representing the leading edge for the next.

In some instances, the length of the sheet material may not be very long with respect to the various programmed lengths so that an appreciable remaining length might be wasted at the end of the sheet. A further step is then preferably added by which no programmed length is considered which, if chosen, would render the remaining length of sheet unpartitionable. In this form the two-cut logic requires a separate determination of length partitioning as permission to consider the first cut length.

The Z-at-a-time logic is also susceptible of extension as a basic step in a multiple Z-at-a-time system. A greater variety of choices under the same Z and S size and value program is obtained by selecting the highest value composite Z in a given length with respect to a leading edge. Each composite Z is a given number of programmed Z's in a particular order with respect to the leading edge, and its value is subject to variation by the order in which its component Z sizes are arranged. This calls for separately evaluating the different permutations of the component Z lengths for a given composite Z. The information storage requirements are very high in such a system where substantial numbers of Z by S sizes are considered, and the preferred apparatus systems specifically described herein operate on the basic Z-at-a-time logic.

B. *Specific example of glass area partitioning*

An example of a defect-spotted glass ribbon is shown in FIG. 2. For the purpose of usefully relating the defect locations to given desired defect-free sizes, a basic dimensional unit is established for which all of the length and width requirements are integral multiples. With a ribbon 124 inches wide as in FIG. 2, a unit of 2 inches has been chosen, giving the glass an effective width dimension of 62 units (S dimension). Of course, if the programmed sizes for cutting were required to vary by as little as 1 inch intervals, the unit size would be selected as 1 inch. However, the unit square remains much smaller than the programmed sizes as a first step in reducing the amount of defect-free glass which must be discarded with the actual defect areas.

Considering the sheet as a mosaic or matrix of 2-inch squares, the defects are located by the Z and S coordinates for the unit square in which they lie. The glass is measured in units back from the leading edge along the length or Z-dimension, and the width or S dimensions are measured from one of the side edges. As illustrated, the coordinates apply to the squares themselves. Their boundaries are thereby indicated. By considering the beginning boundary edge of the first Z or S strip as zero, the number of the squares is the further Z or S boundary or limit line. Thus a square Z6, S22 is bounded by Z unit dimension lines 5 and 6 and by S unit dimension lines 21 and 22.

Looking again to FIG. 2, a number of defects spotted on the glass are located by Z and S coordinates in the table of FIG. 2A. The defect areas are intended to be random since in actual production their number and location cannot be predicted. The defects may be microscopic in size, occupying much less than a unit square, or they may cut across several of the mosaic units, such as the illustrated scratch defect "d," but in any event, each defect is considered as occupying one square. Likewise since each square must be examined, either in whole or in part according to the nature of the defects involved to determine its defect classification, the minimum unit dimension may be effected by the limitations of the defect detecting means. While bulb edges at the sides of the ribbon are, in effect, continuous lengthwise defects, such predictable defects are simply eliminated by trimming. Accordingly, the locating edges herein referred to are reference axes or lines existing as physical edges after any predetermined trimming or squaring cuts are made, whether or not such cuts are deferred until such time as defect measurements or the size cuts are made.

The table of FIG. 2B illustrates a simplified program of sizes to be cut in which eight sizes are listed which may be reduced to three different length or Z-dimensions each having a group of two or three width of S-dimensions, associated with them. Thus for any given Z-cut along the length of the glass sheet there may be a choice of S-cuts. In the table of FIG. 2B, the larger of each S in a family of S-dimensions for a particular Z ranks over each smaller S. Furthermore, each Z x S size is assigned a value which, in this particular case, corresponds to its S dimension of that size. This means, for the example indicated, that different areas having the same S dimension are of equal value, but this is not necessarily anomalous as will be seen.

With this information supplied as to the sizes desired and the defect distribution, the usable areas are pieced out by the two-cut logic (as shown in the table of FIG. 2C). Accordingly each of the Z dimensions (35, 20 and 9) is made the basis of a trial or tentative first cut as measured from the leading edge of the glass. Then as measured from the reference side edge of the glass, each defect is marked off as a strip one unit wide leaving particular available defect-free widths.

In fitting the S dimensions into an available width, the minimum waste partition is resolved by employing the highest ranked S's wherever a choice occurs. If there is no exact partition, the available width is decreased by one, and the fit again tried. This process is repeated until a perfect partition is gained or the defect-free width is exhausted. FIGS. 2D, 2E, and 2F graphically portray the S-fits for the three Z trials tabulated in FIG. 2C. The cross-hatched area represents the defect strip; the single-hatch areas represent the glass discarded as cullet with the defect strip if the Z cut is elected, due to the impossibility of making an initial fit. Sufficiently large waste pieces may be saved, if desired, piecing out special or unprogrammed sizes.

By totalling the assigned values of the utilized sizes for each trial Z, the Z choice is dictated by the highest accumulation. In this case the Z of 20 is chosen since the value is 58—only two unit defect strips plus two additional unit strips of unfittable waste glass are involved.

In the event of a tie in summed values, the tie is systematically broken by initially electing to pick the first (or the last) of tying values encountered and choosing the order of the Z trials accordingly. For this example, while no tie was present, the Z trials were made in the order of decreasing Z length and had a tie of largest value occurred it would have been broken in favor of the first totaled value, i.e., the largest Z.

With the choices of rank in making S fits, of value in choosing a Z after trial fitting, and of order of Z trials for breaking ties, practically any programming demand can be anticipated without requiring human judgment after the program has been set up. It will be appreciated, with the example illustrated, a minimum area waste per Z unit length logic is dictated by making value proportional to S. If value were proportional to Z x S in dimensional units, then the Z of 35 would be chosen in this example, despite the larger amount of waste. If in the S fitting the rank is not in the order of the S dimension, ties of partitioning in the S dimension are broken in favor of the smaller S's and they would, of course, be cut. In the long run (i.e., a day's, a week's, a year's production) the waste is by definition minimal since the programmed sizes have been cut in the programmed order to meet the demand thus analyzed.

In the case where the ribbon is cut into discrete sheets before inspection, as, for example, 180 inch (or 90 unit) sheets, left-over lengths are preferably avoided. This is done by always choosing a Z which is part of an exact fit of the various Z dimensions in the total length. If the highest value Z is not available, the next highest is chosen, and so on. In this instance, any of 9, 20, or 35 may be chosen as the first cut without defeating the lengthwise fit. Choice of a Z of 20 in the first cut leaves 70 units, into which two Z lengths of 35 may fit. However, a Z of 20 (or 9) would be eliminated from consideration for the second cut.

Usually, by filling in the program with a large number of Z's, a greater number of lengthwise choices remain open. The number of trial Z's which are subject to the S trial partitions and valuation are, of course increased, but the burden of added decisions is lightened by their still systematic resolution. If the choice is likely to be limited by reason of few or only large Z numbers programmed, a small remainder in the total length may be tolerated. A preferred method is to try alternatively partitions of the total length number as decreased, by one, two, and three, for example. A fit in any case calls for only a small waste.

C. *Basic partitioning definitions*

At the heart of two-dimensional or area partitioning is a basic method of one-dimensional or length partitioning. Such partitioning may be generally expressed in terms of sets of integers whose sum is exactly equal to a given integer. Partitioning a large sum into selected smaller integers, like factoring a large number into prime factors, is often easier to do than to explain. As in factoring for primes, precalculated tables may be referred to for convenience, and the results are valid whether determined by explicitly expressed logical steps or by trial and error arithmetic techniques. Since a definition of partitioning, as distinguished from factoring, does not appear to be well established, the following expression is offered as definitive at least for the purposes of the specification and claims:

$$A = n_1 a_1 + n_2 a_2 + n_3 a_3 + \ldots + n_n a_m$$

In this expression A is the integer partitioned (i.e., a composite) and $a_i$ may generally refer to the integers of a set $a_1$, $a_2$, $a_3$ etc. which fit into A without remainder. The number of each such integer $a_i$ involved in a partition is $n_1$, $n_2$, $n_3$, etc., or $n_i$. The value of $n_i$ may be zero in the event that its associated $a_i$ is not present in the partition. The use of the cardinal subscripts $1_1$, $2_2$, $3_3$ need not imply any sequential or quantitative order, nor is any numerical identity to be assumed between the $n_i$ and $a_i$ to which the same subscript number is applied.

The sole partition is obvious if the only $a_i$ is the integer 1. It is equally obvious if the only $a_i$ has a value equal to A. There would be no practical problem, and no need to even term the process "partitioning" were only these trivial partitions involved. But this is not the general case.

Significantly, in view of the discovered utility of the partitioning concept as defined, two types of solutions are of particular interest. One may be termed the general solution in which all of the possible partitions of A by the $a_i$ integers are recognized and utilized. The other may be termed the selective solution in which conditions for uniqueness of solution are imposed by assigning rank or order of priority to the different given $a_i$ integers.

General partitioning is utilized in the Z partitioning method previously discussed. Whether or not a given $a_i$ is present (i.e., is its $n_i$ other than zero?) in any of the possible partitions of A, is the information required. Information as to the number of such partitions in which that $a_i$ is present or the number of times ($n_i$) the $a_i$ is present in any one partition may not be necessary. Such a determination is not useful if the $a_i$ set includes the integer one, and higher $a_i$ integers are necessarily implied. Reference is made to FIG. 3 which shows graphically the possible fits of any or all of the $a_i$ integers 3, 5, 8, and 12, into an A integer of 20. The A is shown by an ordered array of evenly spaced parallel horizontal lines 0, 1, 2, 3, ... 20 (only the line segments adjacent the numbers are shown; their extensions are unscribed for clarity of the drawing figure). The partitions are represented by vertical chains of links having respective length spacing lines differing in number by 3, 5, 8 or 12 as indicated. Thus, for an A of 20, referring to FIG. 3, links of 3, 5, 8, and 12 in various chains each shown as terminating on line 20, thus indicating that for an A of 20 any one of these $a_i$ integers may be present in a partition. The choice of any of 3, 5, 8 or 12 as the first Z cut from a Z length of 20 is thus acceptable.

FIG. 3 is further arranged to show the availability of the various $a_i$ integers for each of all the possible succeeding choices. Thus, if an $a_i$ of 3 is the first choice, the A becomes 17, and it will be observed that all of the $a_i$ integers still remain available as a second choice since links of 3, 5, 8 and 12 depend from line 17. If the second chosen $a_i$ is 12, a link for which extends from line 17 to line 5, then for the third choice only an $a_i$ of 5 is available since only a link of 5 depends from line 5. The complete partition is thus 3, 12, 5, and the other possible partitions may be as readily traced from the table. This representation includes permutations of the sets of $a_1$ integers and coefficients $n_1$ constituting one partition (such as 3–12–5, 3–5–12, 5–3–12, 5–12–3, 12–3–5 and 12–5–3).

It should be noted that FIG. 3 does not illustrate all partitions for the A integers less than 20, but only those reached by subtracting one or more of the $a_1$ integers. Thus no links terminate at line 16, despite the fact that it is evenly partitioned by two 8's since 16 is not a subpartition of 20.

While the general solution illustrated by FIG. 3 indicates the acceptability or future freedom of choice with respect to any selected $a_1$, it includes the multiple choices which would make indefinite the S partitioning previously described. An assignment of rank in which, for example, a larger number always precedes, the partitions having lesser numbers of the highest $a_1$ integers are eliminated. Considering the ranking $a_1$ as that $a_1$ link which is connected at its upper end to line 20 of the parallel array in FIG. 3, the highest $a_1$ of any of those available in a general partitioning of 20 is chosen. This, of course, is 12, leaving a next A of 8 for which the general partitions are 8; 5–3; or 3–5. Under the rules, 8 outranks the others, thus automatically reaching a solution for $n_1(a_1)$, which is one, and for $n_2(a_2)$ which is one 8.

FIGURE 4 further illustrates selective partitioning for all A integers up to and including 12, for $a_1$ integers of 4, 3, and 2 in that rank. The constants of the partition-equation are changed here, both to indicate the generality of the approach to a solution and provide a sufficiently simple example for which a mechanical analog can be clearly and concisely illustrated in the succeeding section. In this example it may be noted that each A is partitionable, and that there can be no ties or indecisive choice. For other examples no partition may be available, and the chosen solution is that for the next highest partitionable A. Procedurally, the A is decreased by one until a fit is found for which no remainder exists. The same result may be obtained in this particular example by setting an $a_1$ equal to 1; as a method, however, setting an $a_1$ equal to one disguises the fact that such $a_1$ may not itself be a useful or desired part of a partition. Thus where the other $a_1$ values are high, a partitioning solution may provide a large number $(n_1)$ of ones.

Since the general solution embraces the unique solution, it will be recognized that the unique or selective solution also indicates the presence of the $a_1$ integers, although in one, rather than all of the possible partitions.

II. PARTITIONING MATRICES AND ASSOCIATED CIRCUITS

A. A simple matrix for general partitioning solutions

A simplified electrical matrix for determining which ones of given numbers may be combined to equal a total number is illustrated in FIG. 5. It is a structural analog of the exemplary general solution of the partitioning equation illustrated in FIG. 3 and further provides partitions not only of an A of 20 but for any lesser integers selected as A. Such a matrix provides an instantaneous computation of the partitioning equation for which it is designed without resort to a storage or memory system. As a permission matrix, for example, it can determine which of several considered Z cuts from a given sheet length leave a remainder which is partitionable by the Z program.

Turning now to FIG. 5, an array of horizontal bus bars or conductors 40, numbered 0, 1, 2, 3 . . . 20, represents in this instance a sequence of 20 consecutive integers. The zero bus bar, for example may represent one edge of a rectangular piece of sheet material and the successive integers represent distances along the length of the sheet as measured from that edge. The set of bus bars is termed a matrix, by reason of the chains of cells or links which connect different pairs of respective bus bars. These cells 41, 42, 43, 44 correspond in this example respectively to the $a_1$ integers 3, 5, 8, and 12, each spanning a different set of bus bars spaced in number by the $a_1$ integer associated with the cell.

When a voltage which is positive with respect to the zero bus bar is applied to one of the other bars current flows downwardly through all unbroken chains of cells between the terminal bars. To prevent upward current flow, each cell contains a unidirectionally conducting or rectifying device, suitably a silicon diode 45. The diodes are poled to have a negligible voltage drop in the easy flow direction from an upper bus to a lower one. (The contact pairs shown in each cell are later described and are closed for operation of the matrix.) It will be appreciated that the numbering of the bus bars has a structural and operational significance in view of the diode interconnections, even though the order of diode connections from left to right is a matter of choice.

Significantly, each $a_1$ bus bar span is connected by a cell of the corresponding span. The geometry selected for illustrating the circuit of FIG. 5 ties the like-span cells in chains and groups the chains in blocks to emphasize the completed interconnection. Thus the 3-span block for $a_1=3$ has three vertical chains of cells, the first starting at bus 20, the second at bus 19, and the third at bus 18. In the 12-span block the chains are limited to single cells 44 since consecutive spans would exceed the number of bus bars. All of the partitions of 20 by the set 3, 5, 8, 12, in FIG. 3 are confirmed by the presence of the corresponding $a_1$ cells of the matrix in a unidirectional current path from bus 20 to bus 0. The current path pattern of FIG. 5 is simpler than the chart of FIG. 3 in one respect because the same cell may combine current paths for several partitions. For example, a 12-span cell from bus bar 20 to bus bar 8 places a voltage on bus bar 8 for which several paths exist to the 0 bar. The FIG. 5 paths are more complex in another respect—they include permutations, and are not restricted to combinations. Thus from bus bar 8 to 0 there is one 5, 3 path through first a cell 42 and then a cell 41 and also a 3, 5 path through first a cell 41 and then a cell 42. And, of course, the FIG. 5 matrix goes beyond the diagram of FIG. 3 in that all the possible links are provided for electrical partitioning of integers less than 20.

If current flows through any of the links, the integer equal to its bus bar span is present in a partition of the total integer equal to the total energized span. Since for a permission matrix it is unnecessary to know the specific partitions, the required information is simply provided by a means responsive to current flow through only one terminal cell of each block. As shown in FIG. 5 the cell of each block which has its lower end connected to the 0 bus bar contains a read-out relay coil. As indicated, the relay coils (each shown here and in following drawings as a circle-bearing a reference numeral) for the respective blocks of 3, 5, 8 and 12 are 46, 47, 48 and 49. Other types of indicators may be employed but the relay coils have the advantage of readily providing a number of switching contacts for whatever indicating or control functions may be desired. No diode 45 is needed in the last cell containing the readout relay since no reverse paths are possible by reason of the end-of-matrix connection. All of the cells thus remain unidirectional links.

As a matter of convenience for solving partitioning equations, the respective blocks may be switched in or out of the matrix depending upon which integers are required in the set. Referring for example to the block of 3-span cells 41, a matrix size relay 50 is provided having a plurality of normally open contact pairs. This includes 17 contact pairs 50a, one in each diode cell plus another pair of 50b in the readout cell. The relay coil 50 is suitably energized by connection through a selector switch 51 to a suitable control voltage source indicated as a battery 52. With the switch 51 closed, the relay 50 is energized and all of the 3-span cells 41 are connected into the matrix. Programming of the integer 3 may be indicated as by a lamp L50 connected across the voltage source by another pair of normally opened contacts 50c of the matrix size relay.

Presence of a partition involving the integer 3 is indicated suitably by a second indicator lamp L46 connected across the control voltage source through a normally open contact pair 46a of the readout relay 46. Other control or indicating arrangements may, of course, be served by the read-out relay actuations.

Similar elements are suitably employed for the other $a_1$ blocks of 5, 8, and 12, namely, respective matrix size relays 53, 54 and 55, respective size switches 56, 57, and 58, respective size indicator lamps L53, L54, L55, and respective read-out indicator lamps L47, L48, and L49. More blocks representing other integers may likewise be switched in or out of the matrix for whatever set of integers is to be tested. Switches 51, 56, 57 and 58 are closed, of course, in the partitioning operations described.

To select the A integer to be partitioned, a positive voltage with respect to the zero bus bar is applied to the selected one of the bus bars 40. As shown, this is suitably provided as a rotary selector switch 59 having its rotor wiping the numbered bus bars and connected to the zero bus bar through the voltage source 52. With the switch connected to bus bar 20, for example, all of the programmed integers 3, 5, 8, and 12 are variously involved in some of the possible partitions of 20, and hence the read-out relay of each block will be energized. Any one of the integers is permitted i.e., its subtraction from 20 leaves a remainder which is partitionable. If, for example, a permitted cut of 12 units from a sheet 20 units long is chosen, the remainder of 8 is still partitionable by combinations involving 8, 5 and 3. This is readily determined by adjusting the selector switch 59 to the number 8 bus bar and noting that lamps L46, L47, and L48 are turned on.

Not all the A's are partitionable by this integer program. For example, with the voltage connected to bus bars 7 or 4, no current path is available through any combination 3, 5, 8, and 12. And, of course, an A less than 3 is not partitionable because 3 is the smallest programmed integer. Connections of cells to all of the bus bar spans is shown, however, both as a matter of pattern consistency in illustrating the matrix and to forestall incomplete partitioning in the event other $a_1$ integers are added or substituted by switching in other blocks of cells.

If the matrix is designed to partition only a single integer some cells may be eliminated. For an A of 20, for example, and the $a_1$ program illustrated, there would also be no necessity for cells connected in FIG. 5 to bus bars 19, 18, 16, 13, 7, 4, 2, or 1. These are particular rather than general cases, however, and reference to all spans as being interconnected is not intended to require connection of the unusable spans occurring because of boundary conditions or limited examples.

So long as the matrix need not identify the combinations involved in partitioning or specify the number of times a particular integer is employed in the matrix current paths, the detection or read-out of current through either terminal cell of each block of cells is sufficient. This follows from the fact that all permutations find current paths between the terminal busses. As a result a different one of the permutations of each combination will have part of its current path through each terminal relay of each integer block anywhere involved in a current path. Read-out relays may, if desired, be provided in additional cells for securing additional information. Such modifications are illustrated more significantly in the following subsection in connection with the description of a selective partitioning matrix.

B. *A simple selective partitioning matrix*

A matrix for selective partitioning whereby a unique solution is delivered is illustrated in FIG. 6. It is a structural analog of the solution of partitioning equation illustrated by FIG. 4. As compared with a permission matrix of the FIG. 5 type, the indicated read-out integers are narrowed to only those in the highest-rank partitioning combination. Such a matrix, which also indicates the number of times each indicated integer is present may be termed a command matrix since it furnishes a particular or unique set of instructions best fitting the input conditions according to its built-in logic or decision-making instructions.

The utility of the command matrix for S partitioning may be readily realized. In addition, the FIG. 6 matrix also illustrates other useful features of partitioning matrix design for broadening its scope and versatility. Thus, since S partitioning must accommodate defects wherever they might occur, the matrix illustrated has its A spans bounded by the defects without referring the A span to the zero bus bar. Additionally, while the number of bus bars in the illustrated example is small, the number can be very large and several A's (i.e., integeres to be partitioned) may be partitioned simultaneously.

Referring to the matrix of FIG. 6, a horizontal array of bus bars 60 and numbered 0, 1, 2, 3 . . . 12 represents a maximum A span of 12 as an analog of the selective partition example of FIG. 4.

The vertical directional characteristic of the matrix is provided as before by unidirectionally conducting cells or links 61, 62 and 63, connected respectively across bus bar spans of 2, 3, and 4. Each such cell or link contains a diode 64 poled for current flow from a higher numbered or more positive bus bar to a lower numbered bus bar. All of the available spans of 2, 3 and 4 are connected by the links which again are grouped in blocks corresponding to the $a_1$ integers of 2, 3 and 4 in the particular partitioning set here represented.

Horizontal directional characteristics establishing a declining rank from right to left are introduced by normally closed switches in the bus bars (except the zero bus bar) to the left of each block of cells. With the integers ranked 4, 3, 2 and 3-span block is to the left of the 4-span block and the 2-span block is to the left of the 3-span block. Opening a bus bar switch cuts off the positive voltage supply to all cells having their upper terminals connected to the portion of the bus bar to the left of the switch.

The over-all composite direction of rank or priority is thus from an upper right-hand positive bus bar terminal to a lower left-hand negative bus bar terminal.

Automatic operation of the bus bar switches is combined with the read-out function by providing a cell relay coil in each link. As shown the relay coils for links 61, 62 and 63 are respectively 65, 66 and 67, the coils being in series with each cell diode 64. A first normally closed contact pair 65a, 66a or 67a, associated with its respective relay coil, interrupts the bus bar to the left of the upper connection of the cell to the bus bar. A second normally open contact pair 65b, 66b, or 67b of each relay serves a suitable read-out circuit.

In operation, a positive voltage with respect to the zero bus bar applied to the positive terminal of bus bar 12 causes current flow through a path corresponding to the sole partition indicated for such a value of A by FIG. 4—namely, a chain of three 4-span cells 63 (from bus bars 12 to 8, 8 to 4 and 4 to 0) provides the sole current path. None of the other bus bars are energized, of course, and the portions of bus bars 12, 8 and 4 to the left of the 4-span block of cells 63 are disconnected by the opening of the contact pairs 67a associated with the energized relays of the current connecting cells.

If a voltage is applied between the positive terminal of bus bar 11 and the negative terminal of bus bar 2 for example, the current seeks a path across a span of 9 bus bars. With the integer program and rank here given, it will be appreciated that the correct decision must be, in order, 4, 3, 2. The sole current path is traced from bus bar 11 through a 4-span cell 63 to bus bar 7, from bus bar 7 through a 3-span cell 62 to bus bar 4, and from bus bar 4 through a two-span cell 61 to bus bar 2. Each of the bus bars 11, 7 and 4 is interrupted by the opening of the cell relay contact pair to the left of the upper connection of each energized cell. All other current paths are thus precluded.

Matrix size relays may be desirably employed for switching different blocks of cells in and out of the matrix to program different partitioning problems. As shown in FIG. 7 matrix size relays 68, 69 and 70 are each provided with a plurality of contacts 68a, 69a and 70a which are located in the respective 2-span, 3-span and 4-span cells 61, 62 and 63 shown in FIG. 6. The relays are energized through respective size switches 71, 72 and 73, each switch and relay being connected across a suitable voltage source 74. All of the contact pairs are to be considered as closed, of course, in analyzing the matrix performance for the $a_i$ program of 4, 3, 2. It will be appreciated that bus bar contact pairs 65a are of significance if other blocks of cells are or may be switched into the matrix to the left of the 2-span cells 61.

Also shown in each cell or link of FIG. 6 along with the diode, the cell relay, and the matrix size contact pair is a resistor optionally added to help keep the relay current within convenient operating limits. The resistors in each cell of a given span are of equal resistance. As shown resistors 75, 76 and 77 are provided for the cells 61, 62 and 63 respectively. The utility of the resistors and the selection of their value depends upon the voltage supply employed and is discussed in a further paragraph.

A simple read-out circuit is suitably provided by counting the number of energized cells in each block, suitably by means of normally open contact pairs from each cell relay in an indicator or control network as shown in FIG. 7. For detecting current flow through any of the 2-span cells 61, a galvanometer type indicator device 78 is connected across the voltage supply 74 through parallel circuits consisting of each cell relay normally open contact pair 65b in series with a read-out or value resistor 79. With such an indicating circuit across the voltage source 74 or other stabilized supply, the current flow through the galvanometer is zero if no 2-span cells are energized and increases with the number of contact pairs 65b which are closed.

Corresponding read-out circuits are provided for the 3-span and 4-span blocks, respectively employing galvanometers 80 and 82, read-out contact pairs 66b and 67b, and read-out resistors 81 and 83. By either adjusting the respective ratios of resistors 79, 81 and 83, or by providing respective galvanometer scale multiplication factors, indicated values proportional to desired multiples of the respective $a_i$ integers times the number of such integers involved in a partition are obtained. Totalling the galvanometer readings thus provides a total value for the partition.

It is obvious that, without departing from the spirit of the invention, various voltage or current responsive devices, whether employed as indicators or control devices, may be substituted for the galvanometers.

Likewise, it will be appreciated that features of the matrix of FIG. 6 can be employed in a permission-type matrix. For example the normally closed contact pairs 65a, 66a and 67a in the bus bars and associated with the individual cell relays may be eliminated so that the partitioning is not selective. The galvanometer readings for the respective blocks then indicates the number of cells of each span which are energized. Embraced within this information, of course, is the indication as to whether any cell rather than no cells are involved in a partition. If only the more general information is desired, the read-out network resistors 79, 81 and 83 can also be omitted. Such a modification, requiring use of cell relays in each cell, is of advantage where the spans to be partitioned are not advantageously referred to the same or permanent terminal (zero) bus bar.

Whether or not it is simplified to serve as a permission matrix rather than a command matrix, the apparatus of FIG. 6, like the apparatus of FIG. 5, assures a terminal connection of at least one cell in each block. In addition it may be seen that the FIG. 6 matrix, by opening the bus bar switches, selectively excludes all but one terminal cell at each energized bus bar.

Briefly, immediately after the application of the bus bar voltage, multiple current paths are established through the matrix of FIG. 6 corresponding to all the partitioning permutations as in a permission matrix of the type shown in FIG. 5. In that sense also one cell of each block, connected either to the upper or lower bus bar of the energized span, carries current if integers of that cell span are involved in a general partitioning solution. After the energized relays open their normally closed contacts, the redundant paths are eliminated, ultimately in favor of the unique selective partitioning solution. It is an advantage of the circuit structure that relay pickup or actuation times are not critical, and the correct solution is attained even if the cell relays in the lower ranked cell spans should happen to have quicker pickup times than relays in the higher ranked spans.

C. *Matrix voltage distributors*

While voltages may be applied by manually controlled switches across the selected bus bar span of a matrix, such as that illustrated in FIG. 6, the automatic correlation of applied matrix voltages with the location of defect-free spans of a sheet material being partitioned offers advantages for high-speed operation.

For economically meeting the requirements of a given installation, it is to some extent a matter of designer's choice to either increase the number of matrix bus bars to accommodate simultaneous partitioning of several spans or apply voltage at time-spaced intervals across appropriate spans of a smaller matrix. But whether the user chooses to employ part or all of the various novel circuit structures in practicing the invention, it is not the least advantage thereof that such choices are here made available.

The voltage distributors of FIG. 8C and 8E are such novel structures. Each uses double-throw double-pole switches to apply the required voltage between related bus bars.

As a simple example FIG. 8A represents a strip of sheet material 12 units long and having defects in the first and ninth units. Lengths of seven and three units, respectively, are available for partitioning. In the defect swtiching system shown in FIG. 8B, twelve defect relays 85–1 through 85–12 correspond, respectively, to the units 1 through 12 of the sheet of FIG. 8A. Relay actuators 86–1 through 86–12, shown as simple switches, energize their respective relays when closed by connecting the relay coils across a voltage supply 87. The relay contact pairs may be arranged in either a series or parallel voltage distributing system for energizing the matrix of FIG. 6 in accordance with the reported defect locations.

For the defect pattern of FIG. 8A, switches 86–1 and 86–9 are shown closed in FIG. 8B to energize defect relays 85–1 and 85–9. Switches 86–1 and 86–9 may be, for example, automatically operated by photoelectric cells in a defect scanning circuit or manually operated in response to observation of a defect. In either event the actuated defect relay contact pairs reflect the defect-free spans beween them as well as the location of defects on the sheet. While the example is purposely simple to better illustrate complete connections to the small 12-span matrix of FIG. 6, it will be appreciated that voltage switching for much larger matrices subject to more complex defect patterns is advantageously available.

(1) *A series-type voltage distributor.*—The series voltage distributor of FIG. 8C applies a voltage to each clear or defect-free span which is proportional to the length of the span. Twelve defect current voltage sources 88–1 through 88–12 are the unit power supplies for the respective bus bar spans corresponding to unit lengths one through twelve of the sheet of FIG. 8A. Contact pairs *a, b, c, d* of the double-pole double-throw defect relays 85–1 through 85–12 connect the voltage supplies to each other and to the terminals of the FIG. 6 matrix as dictated by the defect locations. The terminals +1 through +12 and −1 through −11 in FIG. 8C, along with the zero terminal, are the ends of the bus bars of corresponding number in the FIG. 6 matrix. The switching system connects the unit power supplies in series for each defect-free span and through normally closed contact pairs *b, c.* It also connects the positive and negative terminals of the series supply to the respective positive and negative bus bar terminals of the corresponding matrix bus bar span through normally open contact pairs *a, d.* The voltage supplies 88–1 and 88–9 for defect units one and nine are left unconnected.

Looking to the details of the FIG. 8C connection, the defect relay contact pairs in FIG. 8C are horizontally aligned with the representation of the corresponding defect relay coil in FIG. 8B for clarity in following the switching operations. Contact pairs *a, b* of each relay are a first single-pole, double-throw switch since they have a common pole or center terminal, and contact pairs *c, d* of each relay are a second single pole, double-throw switch. Referring to any unit or corresponding switch or voltage supply in terms of the number of units from the bottom of FIG. 8A, 8B, or 8C as *m*, each *m*th voltage supply in FIG. 8C has its negative terminal connected to the common pole of contact pairs *c, d* of the *m*−1 defect relay and its positive terminal connected to the common pole of contact pairs *a, b* of the *m*+1 defect relay. The end terminals of contact pair *c* of relay *m* and contact pair *b* of relay *m*+1 are connected for series connection of the voltage supplies. The matrix *m*th bus bar connections are from the negative bus end to the end terminal of contact pair *d* of relay *m* and from the positive end to the end terminal of contact pair *a* of relay *m*+1.

End connections at the extremities of the twelve-supply series are simple. Series voltage connections are omitted, so that contact pairs *a* and *b* of defect relay 85–1 and contact pairs *c* and *d* of unit defect relay 85–12 are not used (and hence not shown in FIG. 8C). The positive terminal of the twelfth unit voltage supply is suitably permanently connected to the positive terminal of bus bar 12 and the negative terminal of the first unit voltage supply 88–1 is similarly connected to the zero bus bar without interfering with the selective switching function.

The operation of the voltage distributor in the absence of any defects which result in energizing the defect relays is simple. The twelve voltage sources are simply connected in series between the positive terminal of the twelfth bus bar and the zero bus bar as would be desired, of course, in the absence of span-restricting defects. This may be readily appreciated by the fact that all of the *a* and *d* matrix contact pairs remain open and all of the *b* and *c* series contact pairs closed, leaving the direct connections from the positive terminal of the twelfth voltage supply to the positive terminal of bus bar twelve and from the negative terminal of the first voltage supply to the zero bus bar.

Operation under defect conditions may be appreciated by following the example of FIG. 8A in which the first and ninth units of the sheet material are defective. The circuits of FIGS. 8B and 8C accordingly show defect switches 86–1 and 86–9 closed with the contact pairs of relays 85–1 and 85–9 changed from their normal state. As a result, and as further illustrated by the simplified circuit representation of FIG. 8D, voltages are applied or distributed between two different spans of the matrix. Thus, seven voltage supplies 88–2 through 88–8 are connected in series between the positive terminal of bus bar 8 and the negative terminal bus bar 1. Three voltage supplies 88–10, 88–11, and 88–12 are connected in series between the positive terminal of bus bar twelve and the negative terminal of bus bar nine. The first and ninth voltage supplies are left unconnected.

The flexibility of the voltage distributor in providing direct correspondence between the defect-free spans of the sheet material and the corresponding matrix bus bar for any possible defect pattern will be appreciated. Consecutive operation for the different spans is not required and partitions are simultaneously made in the FIG. 6 matrix. While the read-out from each of the cells of the FIG. 6 matrix may be separately recorded, the resulting read-out arrangement in the circuit of FIG. 7 remains of particular utility in providing a cumulative read-out for all of the simultaneously derived partitions as a total for comparison with that for partition of a different section of sheet material having another defect pattern.

It will be appreciated that large bus bar spans will involve larger voltages, and all the resistors 75, 76 and 77 previously indicated as optionally included in the matrix of FIG. 6 play a helpful role. Thus, if the relays all have a common rating, the resistance of each cell is desirably proportional to the cell span to maintain equal voltages and equal currents in all of the cells in a given current path. With, for example, ten volt sources and relays having 1,000 ohm coils with a rated 10 milliamperes operating current, the resistor 75 of each two-span cell 61 is of the order of 1,000 ohms to limit the current to the rated value at 20 volts. Correspondingly, to maintain the rated conditions for the 3-span and 4-span cells 62 and 63, the respective resistors 76 and 77 are 2,000 and 3,000 ohms.

(2) *A parallel-type voltage distributor.*—Problems associated with the switching of high voltages are eliminated by use of a parallel type of power supply in which the same given voltage is applied to each defect-free span of the matrix. Such a circuit is illustrated in FIG. 8E in which defect relay contacts *a', b', c'* and *d'* are again horizontally alined with their respective defect relays 85–1 through 85–12 of FIG. 8B to clearly indicate the rearrangement of the same switching contacts for parallel operation. Voltage supplies 88–1' to 88–12' represent the twelve supplies for the respective twelve units of the sheet material of FIG. 8A and the bus bar spans of the FIG. 6 matrix. As in FIG. 8C the positive and negative bus bar terminals are also shown.

The contact pairs *a', b', c',* and *d'* of relays 88–1' through 88–12' are connected differently in the parallel circuit of FIG. 8E than the series circuit of FIG. 8C in order to remove the common potential between bus bars effectively bounding the sides of a defect unit or strip of units. Thus each *n*th defect relay has its normally closed contact pair *b'* connected between the positive terminals of voltage supplies *n* and *n*−1 and its normally closed contact pair *c'* connected between the negative terminals of the same supplies. The connection from the positive terminal of the *n*−1 supply is made to the common pole of the contact pairs *a'* and *b'* of the *n*th relay. The end terminal of normally open contact pair *a'* is connected to the positive terminal of matrix bus bar *n*−1. The negative terminal of supply *n* is connected to the common pole of normally closed contact pairs *c'* and *d'.* The end terminal of normally open contact pair *d'* is connected to the negative terminal of matrix bus bar *n.* End connections for the first and last units are simple. Contact pairs *a'* and *b'* of the first defect relay 88–1' are merely left unconnected, and the end contact of normally closed pair *c'* becomes the minus zero bus bar terminal and no zero power supply is needed. The positive terminal of the twelfth voltage supply is the positive terminal of the twelfth bus bar.

In operation, in the absence of defects, the defect relay contact pairs $a'$, $b'$, $c'$, $d'$ in their normal or unenergized condition connect all of the voltage sources in parallel. The source voltage is applied across the matrix from the positive terminal of bus bar 12 to the zero bus bar. Under the defect conditions of FIG. 8A, and with the defect switches and defect relays of FIG. 8B correspondingly actuated, the voltage distribution effected in the FIG. 8E circuit is shown by FIG. 8F. As in the previous case, the control voltage is applied, in correct polarity, between bus bars 8 and 1 and bus bars 12 and 9. The two distributed voltages are the same due to the parallel connection, and no voltage connections are made to the bus bars between which lie defect units one and eight.

With the parallel-connected voltage distributor, the cell relays of the matrix are chosen with wide-range operating characteristics based on a maximum coil current occurring upon application of the matrix voltage across one cell. The same source voltage may be applied to one relay or (in the example delineated by the FIG. 6 matrix) to as many as three relays in series. For larger matrices, the pickup range would be higher, calling for high relay sensitivity or operating current range. For such operation the cell resistors 75, 76 and 77 of FIG. 6 may be made equal to each other or omitted.

For either type of voltage distribution, it may be seen that voltages are applied through a switching system lending itself to automatic application to different spans of the same matrix. Reference to a constant or fixed bus bar becomes unnecessary and, in effect, voltage terminal bus bars chosen afresh for each partitioning operation.

D. *Matrix universal cell blocks*

In what is here termed a universal cell block, a relatively simple matrix size switching circuit and small number of diodes can be switched to correctly interconnect the diodes across all the bus bar spans of a partitioning matrix for any selected size span corresponding to a selected one of a set of $a_i$ integers. Such an arrangement offers maximum flexibility and versatility of the matrix for a given number of switches and diodes in terms of matrix rearrangement for different groups of $a_i$ blocks and reassignment of $a_i$ rank.

Looking now to FIG. 9, a universal cell block 89 incorporating a switching arrangement for a matrix having a maximum span of twelve is illustrated. Any $a_i$ span from one to twelve is accommodated with no more than twelve cell or read-out relays and twelve diodes in the block. Larger span matrices are effectively utilized for fully realizing the advantages of the universal cell as well as solving more difficult partitioning problems, the bus bars 90 comprising plus bus bars numbered 0, 1, 2, 3 . . . 12 providing a maximum matrix span equal to that of FIG. 6 and operable by the voltage distributors already shown in connection with FIGS. 8A to 8F.

Each cell of the FIG. 9 matrix (separately shown in FIG. 11), has a series-connected relay 91 and a diode 92. Each cell series combination has its upper terminal connected directly or permanently to one of the bus bars 1 to 12, and for aid in identification the relay coils in FIG. 9 also bear the number of the bus bar which carries them. The lower end of each cell is connected through a multiposition switching arrangement to any one of the lower numbered bus bars.

Twelve universal switching relays 93 are employed. As shown in FIG. 10 the relay coils are connected across a control voltage source 94 through a 12-position selector switch 95. The selector switch positions and the universal switching relay coils 93 connected to the respective switch positions are further numbered 1 through 12. The number of the selector switch position and the universal switching relay coil actuated thereby corresponds to the selected $a_i$ integer or bus bar span rather than to the number of a cell or matrix bus bar. In the example shown, with the selector switch 95 set at its fourth position, the actuation of universal relay 93–4 interconnects each available span of four bus bars in the matrix with the appropriate ones of the 12 cell relays 91 required for the complete connection.

The relatively small total of switching contact pairs 93a of the universal switching relays 93–1 through 93–12 are enclosed within the broken line triangle in FIG. 9 bearing the reference number 93a. Each contact pair 93a within the triangular configuration bears a further number 1 through 12 corresponding to the identification of the universal relay coil in FIG. 10. The number of switching contact pairs of each universal relay 93 is equal to the number of spans of that size, which is to say it is also equal to the number of cells which must be connected in that block. Universal relay 93–1 accordingly has 12 contact pairs 93a–1 respectively connected between the lower terminal of each cell and the bus bar immediately (span difference of one) below it. At the other extreme, since the number of universal cell contact pairs or switches required for a given span varies inversely with the size of the span, only one contact pair 91a–12 is required for a span of 12. There is, of course, only one cell, namely 91–12, which can possibly be connected across the 12-span matrix.

In operation, for any selected span or size, all useful spans of that number within the matrix are interconnected. With the exemplary span of four, the upper nine of the twelve cells are connected, and the cells 91–1, –2 and –3 are left open as desired. The arrangement also lends itself to economical expansion of the total matrix size, particularly for the more difficult problems (i.e., difficult by conventional partitioning calculations) in which larger integers make up the integer set and in which priority or rank is likely to be assigned to the higher integers of a set. Thus, since the integer 1 in a partitioning set would be useful in practical problem solving only where partitions could not be obtained with numbers other than 1, the facilities to accommodate the integer 1 and successively higher integers may be omitted in many cases, thus saving per progressive omission both one cell plus the switch set having the greatest required number of contacts. On the other hand, addition of a higher integer choice requires a relatively small number of switching contact pairs for the added cell involved.

Turning now to the rank and read-out means of the universal cell block of FIG. 9 for whatever $a_i$ integer has been selected, each cell relay 91 has a normally closed contact pair 91a and a normally open contact pair 91b (also indicated in FIG. 11). The rank or priority switching contacts 91a are connected in the bus bar carrying that cell relay.

As shown in FIG. 9 each such normally closed contact pair 91a–1 to 91a–12 is connected to interrupt bus bar 1 to 12 respectively to the left of the connection of the cell to the bus bar. Current flow through any of the cell relays thus results in interrupting the voltage supply connections of the same-numbered bus bar to the next $a_i$ block. While in FIG. 9 the left hand ends of a bus bar 90 are indicated with negative plurality as for return to the negative side of the voltage supply, it will be appreciated the next ranking $a_i$ block may be inserted there instead.

A simple circuit for indicating the number of relays actuated in any selector switch position (which is the occurrence of the selected $a_i$ integer involved in a given partition) is shown in FIG. 10 in which a galvanometer 96 or other indicating or control instrument is connected across the control voltage source 94 through multiple possible paths. Each such path may suitably consist of a read-out resistor 97 and one of the normally open contact pairs 91b–1 through 91b–12 of the 12 bus bar cell relays. The current flow may thus be made to vary with the number of contacts 91b which are closed, indicating both the presence of the selected $a_i$ block integer in a partition and also the times that integer is present. With $a_i$ set at four and a voltage applied between the positive terminal of the twelfth bus bar and the zero bus bar, cell relays 91–12, 91–8, and 91–4 would complete the circuit. Accordingly, since the relays are current responsive, the rank contact pairs 91a–12, –8, and –4 would be open to remove potential from bus bars 12, 8 and 4 to the left of the cells, and contact pairs 91b–4, –8 and –12 would connect the galvanometer across the voltage supply 94 through three read-out resistors 97 connected in parallel.

Several such universal cell blocks are readily connected in one matrix as illustrated by FIG. 12 where three such universal cell blocks 89′, 89″, and 89‴ are employed. With their respective selector switches set for integers 4, 3 and 2, reading from right to left, the matrix connections of the FIG. 6 circuit are duplicated.

The fact that as many universal cell blocks as there are $a_i$ integers in the partitioning set can be accommodated in a matrix without rendering more complicated either the cell blocks or their interconnection has real and significant advantages. Economy and simplicity of circuit structure, as well as compactness and convenience, are provided where a single installation must be programmed for various problems. Even if the priority switches were not required, or (more likely) if the rank were always from the highest number to the lowest, twelve fixed span blocks of cells with their block disconnecting switches would be required for a three-integer set of the range of choice provided by the three universal cell blocks in the FIG. 12 matrix. Further, where rank must remain variable, the number of fixed-span blocks would be approximately multiplied by 12. In the FIG. 12 matrix, however, if the order of priority were to be 3, 4, 2 (or any sequence out of downward numerical order such as 10, 11, 12) it is not required to reconnect the different universal cell blocks in a different sequence, and the same three universal blocks suffice.

E. *The parallel-return dual matrix*

The same selective partitioning operation previously described may also be provided by what is termed a parallel-return matrix. Such a matrix is designed to operate each read-out relay coil involved in any partition with the same relay voltage. Unlike the permissive matrix illustrated in FIG. 5, the read-out relays need not be connected to the same zero or reference bus bar in order that all of the relays involved operate in parallel with respect to a voltage source. And unlike the matrix of FIG. 6, the read-out relays are not placed in various series-parallel combinations for different partitioning solutions, even though all of the functions of the selective matrix remain available.

(1) *Dual matrix with pre-selected $a_i$ blocks.*—For an understanding of the operation of the parallel-return matrix and the modifications of its structure for various types of installations, reference is made to the selective or command decision partitioning matrix illustrated in FIG. 13. This matrix shown has a span of twelve with two cell blocks shown connected for $a_i$ values of 4 and 3 respectively and in that order or priority in rank. A matrix of such dimensions is directly comparable with that of FIG. 6. The matrix operates as if each of the read-out relays had one terminal connected to a common or ground return without interconnecting the matrix bus bars except through the desired partitioning paths.

This parallel operation of the read-out relays may be easily perceived by portrayal of the circuit as a dual matrix, having, as shown in FIG. 13, an upper matrix 100 (which may be called the positive matrix), and a lower matrix 101 (called the negative matrix). Referring first to the upper matrix, a set of numbered bus bars 102 numbered 1 to 12 are provided. With rank in this case reading from left to right, a positive voltage supply connection is made to the left-hand end of one of the bus bars. The cells 103 interconnecting conductors or bus bars 102 differing in number by four represent a cell block for $a_i=4$. To the right of this cell block and beyond the priority disconnect switches 108a–4 to 108a–12 are lower priority conductor extensions 102′. Cells 104 interconnect each pair of bus bars 102′ separated in number by three, representing a cell block for $a_i=3$. Successively lower rank blocks may extend as required to the right, starting with bus bar +1″ to +12″. If, for example, a voltage were applied between bus bar terminals +12 and +1 (representing an A-span of 11), low impedance (essentially short-circuit) current paths would be traced by the three permutations of the single partition available (namely, 4–4–3, 4–3–4, or 3–4–4).

As further shown in FIG. 13, the lower or negative matrix 101 has a set of conductors or bus bars 105 numbered 1 through 12 plus a zero bus bar. To one of these is connected the negative terminal of a voltage source. The cell connections duplicate those of the upper or positive matrix. Sets of diodes 106 and 107 span negative bus bars spaced four and three in number respectively. The negative bus bars are continuous and need not be interrupted by priority or rank disconnecting switches. A voltage applied between a given pair of negative bus bars would generate the same combination of essentially short-circuit current paths through the respective cells 106 and 107 as would occur through corresponding cells 103 and 104 if the voltage were applied between similarly numbered conductors in the upper matrix.

Means responsive to current flow through each link or cell involved in a partitioning circuit such as the coils of relays 108 and 109 cross link the upper and lower matrices. Each useful $a_i$ span between a given numbered cross bar in the upper matrix and a bus bar of lower number in the lower matrix is linked by such a priority or read-out relay. Thus for the left hand cell block ($a_i=4$) in FIG. 13, each pair of positive and negative bus bars having a difference in number equal to 4 are linked by a priority or read-out relay 108. The same circuit connection may be expressed by stating that the upper terminal of each read-out span or link is connected to an upper terminal of each matrix cell or diode in the positive matrix while the lower terminal of each read-out span is connected to a lower terminal of the corresponding cell in the negative matrix. For the right hand block, the read-out relays 109 likewise span positive bus bars 102′ and negative bus bars 104 differing in number by three. In each case, for convenience of identification, the relay link is identified by the number of the positive bus bar to which it is connected, i.e., 108–4, 109–12.

Since the composite matrix thus illustrated is of a selective or command decision type, a pair of normally closed contacts of each such read-out relay is inserted in the positive bus bar to the right of the read-out span connection to that bus bar. Contact pairs 108a–4 through 108a–12 are accordingly shown at the right hand end of bus bars 102; contacts pair 109a–3 to 109a–12 are shown at the right hand ends of bus bars 102′. For serving further indication or control functions, each relay may be provided with another pair or other pairs of contacts (not shown).

With the circuit configuration shown, and despite the absence of any substantial voltage drop across the diodes in the forward polarity, full voltage is applied across only the read-out relays properly representative of elements present in a partition. As a precaution to prevent return paths which would place relay coils in series with each other, a diode 110 is inserted in series with each read-out relay and is poled for positive current flow from the upper matrix to the lower one.

In operation, with one of the upper matrix bus bars at a positive potential with respect to one of the lower matrix bus bars, the total number to be partitioned is established by the difference in the numbers of the two connected bars. For example, with the voltage distributor of FIGS. 8C and 8E or other voltage source connected between the +12 and −1 terminals, the problem programmed is partitioning of 11 by partitioning elements 4, 3 and in that rank. The solution is 4–4–3, as indicated by current through relays 108–12, 108–8, and 109–4. Before any of the normally closed priority or rank disconnecting contact pairs of these relays are opened, current also flows through the relays involved in lower priority solutions. In this case, only one partitioning solution is possible, but redundants paths involved in permutations 4–3–4 and 3–4–4 are eliminated when the priority switches open.

The reasons for the particular circuit connections, as well as the operation itself, can be more readily visualized by tracing out the current paths involved in the ranking 4–4–3 solution to the problem. These current paths from bus bar +12 to bus bar −1 are:

(1) From bus bar +12 through relay 108–12 to bus bar −8; thence either (a) through a diode 106 to bus bar −4 and through a diode 107 to bus bar −1, or (b) through a diode 107 to bus bar −5 and through a diode 106 to bus bar −1;

(2) From bus bar +12 through a diode 103 to bus bar +8, through relay 108–8 to bus bar −4, and through a diode 106 to bus bar −1; and (3) From bus bar +12 through a diode 103 to bus bar +8 through a diode 103 to bus bar +4, and through relay 109–4 to bus bar −1.

The other initially existing paths are opened by the opening of read-out relay contact pairs 108a–12, 108a–8, and (for any lower rank cells to the right of bars 102') 109a–4. Analyzing the operation, the various paths through two 4-span and one 3-span diode cells which would be defined between a span of 11 in a single matrix are divided between the two matrices with a read-out cross-link between them automatically substituted for one of the diodes in each path.

Any available partitioning of any other number within the matrix span is similarly provided. Obviously, since the diodes themselves offer very little resistance, the number of bus bars in each component matrix can be very greatly increased. Thus even if there are ten partitioning element numbers involved in any partition, the ten relays energized are operated in parallel and not in series. It will be appreciated that even if relays operating over such a wide range were conveniently available, delicate adjustments to assure proper operation during the dynamic phase of the operation (when the relays are closing and opening their respective contacts leading to the elimination of alternative or redundant paths) are made unnecessary.

It will be appreciated of course that in referring to the matrix components as upper or lower or the bus bars as bearing certain numbers, the terms have been employed as a matter of convenience for the reader following the structural principles and operation involved. As in the matrix structures previously described, it is understood that the circuit relationships and not the physical configuration or location of the conductors or other components in the wired versions of the circuit governs the definition of the matrix geometry.

At this point it may also be better appreciated that under particular conditions, certain bus bar spans are not usefully interconnected by diodes. In no case need a zero bus bar be employed in the upper matrix although it may be wired in without affecting matrix operation if exact symmetry of upper and lower matrices facilitates wiring and maintainance on particular testing circuits. Any such path as, for example, from bus bar +4 to a bus bar zero in the upper matrix offers no possibility of continuation to a lower numbered bus bar in the lower matrix or completion of a useful path. With the particular $a_1$ values of 4 and 3 as illustrated, wiring of diode connections to bus bars −10, −11, and −12 in the lower matrix can be omitted since these bus bars differ from the highest number positive bus bar by a number less than the smallest partition element ($a_1+3$). For the general case, however, where the bus bars illustrated represent any sequence within a larger matrix, and for flexibility and versatility in case of addition of other cell blocks to the matrix, the full connections are desirable as illustrated.

(2) *Dual matrix with universal cell blocks.*—Parallel return dual matrices constructed for S-fitting in glass area partitioning have profitably incorporated universal cell block switching. FIGURE 14 illustrates a 12-span matrix having the universal switching relay of a single cell block energized for an $a_1$ of 4. Direct comparison with the similarly dimensioned cell blocks of the FIG. 6 and FIG. 13 matrices illustrates that the matrix logic and operation are the same despite the different appearance of the FIG. 14 matrix. For convenience in following the description, the same reference numerals employed in FIG. 13 have been applied to corresponding components of the FIG. 14 matrix. Auxiliary to FIG. 14, FIG. 15 particularly identifies one of the twelve similar relay subassemblies incorporated in the matrix, and FIG. 16 illustrates the universal switching relays.

Referring now to FIG. 14, a set of twelve numbered positive bus bars 102 is shown in horizontal array with their left hand ends (+1, +2, +3, . . . +12) as input terminals. Negative bus bars 105 (−0, −1, −2, . . . −12) are shown in vertical array in the matrix and are continued horizontally above the matrix (conveniently as a cable 111) to also serve as the negative return conductors for whatever lower ranking matrix cell blocks may be connected to terminals +1', +2', +3', . . . +12' to the right of the illustrated matrix block. A voltage source 112, suitably the parallel voltage distributor of FIGS. 8E and 8F is by way of example shown as connected across the entire matrix span between bus bars +12 and −0. With an A of 12 and an $a_1$ of 4, the selective partitioning solution is 4–4–4. The operation of the matrix to effect this result will become apparent as the description proceeds.

The matrix relay and diode components and connections other than those provided by the universal cell block switching arangement are conveniently grouped as twelve subassemblies 113, one of which is outlined by a broken-line rectangle in FIG. 14 and separately shown and identified in FIG. 15. In FIG. 15 priority or read-out relay 108–n represents any one of the read-out relays 108–4 through 108–12 connected in circuit for $a_1=4$ (it also being the number of the number of the positive bus bar to which the read-out relay link is connected). The diode 110 in series with each relay coil prevents series paths through several coils as previously mentioned. Normally closed contact pair 108a–n continues bus +n as bus +n' to the next ranking matrix cell block. An additional contact 108b–n in FIG. 15 (not shown in FIG. 14) is available for control or indicating purposes. Positive matrix cell diode 103 connects bus bar +n to bus bar +(n−4); the negative terminal of the relay 108–n is connected to bus bar −(n−4). The negative matrix diode 106 connected to the negative terminal of each relay 108n is not part of any current path through relay 108n (its polarity opposes that of diode 110), and its positive terminal is connected to negative bus bar n−4.

The universal cell block switching arrangement by which the subassemblies 113 are connected to the prescribed dual matrix bus bars has its control circuit shown in FIG. 16.

Universal switching relays 115–3 through 115–12 provide switching contacts for selecting the connections of both the diodes and the relay coil of the subassemblies 113 for any one of $a_1=3$ through $a_1=12$. The desired one of series switches 116–3 through 116–12 is accordingly closed to place an energizing power source 117 across the selected size switching relay.

The multiple normally-open contact pairs of the switching relays 115n connections are described in the preceding subsection directed to the matrix universal cell blocks. Since similar positive and negative component matrices are required in a dual matrix the number of contact pairs required is doubled. Only a minor departure from connections required for the component matrices is involved since the zero bus bar of the positive matrix and cell connections to it are not necessary and are simply omitted in the positive matrix of FIG. 14. A first block of normally open contact pairs or switches 115a enclosed in a broken line triangle in FIG. 14 illustrate the switch connection of the lower (negative) terminal of the positive matrix diodes 103 to the positive bus bars 102 (lower connection of each switch). Similarly a second block of normally open contacts 115b, also shown in a broken line triangle, connects the lower (negative) terminals of the negative matrix diodes 106 to the negative bus bars 105.

Referring specifically to the connections of multiple contact pairs 115a–4 and 115b–4, these contacts are closed to define an $a_1=4$ cell block by the activation of relay 115–4 as indicated in FIG. 16. Thus the eight contact pairs 115a–4 span through diodes 103 all positive bus bar spans separated in number by four. Likewise the nine contact pairs 115b–4 span through diodes 106 all negative bus bar spans separated in number by four. The read-out spans consisting of each priority or read-out relay 108–4 through 108–12 plus its series path prevention diode 110 are each thereby connected between positive and negative bus bars differing in number by four to duplicate the FIG. 14 connections for the $a_1=4$ cell block. Relay 108–3, it may be noted, is not connected into the matrix but would be used if switching relay 115–3 were energized as when $a_1=3$.

With the matrix programmed for partitioning of $A=12$ by $a_1=4$, as shown in FIG. 14, the current paths through the matrix are shown by heavy lines. Positive bus bars 12, 8 and 4 place the same source potential with respect to the negative zero bus bar across the read-out relays 108–12, 108–8, and 108–4, respectively. Negative return paths are respectively provided by negative bus bars 8, 4, and 0 respectively. While only the zero bus bar is directly connected to the negative voltage supply terminal, negative bus bar 8 is connected through a diode 106 to negative bus bar 4, and negative bus bar 4 is connected through a diode 106 to negative bus bar 0. Each current path includes but one read-out relay for applied voltage of the indicated polarity, as desired for effective paralleled energization of the read-out relays. The normally closed switch contact pairs 108a–4, 108a–8 and 108a–12 of the three energized relays are opened to deenergize lower rank matrix connections to positive bus bars 4', 8' and 12'. The presence and location of the $a_1=4$ spans or numbers may also be indicated by closing of their respective 108b contact pairs (shown only in FIG. 15). The simple example here is selected to illustrate the operation of a dual matrix with but the one cell block shown; all the advantages of selective partitioning with a plurality of element numbers and any chosen rank are available.

F. *Automatic reprogramming*

In a partitioning problem solution there are no remainders since partitioning by definition calls for the partitioned number to be the exact sum of the partitioning elements. In practical applications, however, if the number A representing a quantity to be divided or cut is not partitionable by the given $a_1$ elements, it may be desirable to accept a small remainder. The method of reaching an acceptable solution described in this subsection is to reprogram the problem when an A is found non-partitionable by reducing the number A by one and again attempting the partitioning, these steps being repeated until a partitioning solution is possible. The eliminated remainder may, for example, represent the discarded difference between the defect-free available span and the largest length which can be partitioned.

The waste of material represented by the remainders is still usually preferred to whatever solutions are available by changing the $a_1$ elements and without changing the A value. Thus at first blush it might appear that an $a_1$ block of 1 could instead be added to a matrix. So long as the number 1 is one of the partition elements, of course, any integer could be partitioned. Generally speaking, such solutions are spurious or frivolous. They are also of dubious practical significance in sheet material partitioning in which even the smallest useful $a_1$ values are integral multiples of a minimum unit corresponding to the defect square dimension. For example, if an A of 35 were to be partitioned by a set of $a_1$ elements of number and rank 20, 17, and 1, the solution as partitioned by a selective or command matrix would be 20–1–1–1–1–1–1–1–1–1–1–1–1–1–1–1 (one 20 and fifteen 1's). The solution would be wasteful if, in the physical counterpart, the $a_1=1$ element is not useful. If the set of $a_1$ integers is instead kept at useful values of 20 and 17 in that order of rank and the A is reduced by 1 to 34, the solution by a selective matrix is 17–17. Put in general terms, given a set of $a_1$ elements, and any arbitrary chosen number, the largest partitionable integer A within the chosen number is found by successively decreasing the number by one, as partitions are attempted, until a partitionable A is reached.

The apparatus described below automatically performs the reprogramming process by incorporation of what are called unit remainder eliminator circuits.

Referring now to FIG. 17, input and output connections are illustrative for a 12-span selective matrix of the type previously described in FIG. 14. The positive terminals 120 numbered +1 through +12 at the right hand end of the drawing represent the connections to the highest ranking matrix bus bars 102 of similar number on FIG. 14. The array arrangement of negative conductors 121 numbered 0, and 1 through 12 ending at the right end of the drawings are continuations of the return conductors 111 from the negative side of the FIGURE 16 dual matrix. However, the parallel-type voltage distributor 112 is not connected directly between the positive and negative bus bar terminals as shown in FIG. 14. While the negative terminals −1 through −12 of the distributor are also those of the negative bus bars, the positive terminals of the distributor are termed +1 through −12. Instead, as shown in FIG. 17, a set of 12 defect relays 123–1 through 123–12 are selectively operated by closing of or more swtiches 124–1 through 124–12 to control the parallel type voltage distributor by means of normally open contact pairs *a* and *d* and normally closed pairs *c* and *d* of each relay and which provide a double-throw, double-pole switching action for each relay. The switch arrangement shown is that previously illustrated and described in connection with FIGS. 8B and 8E, except that the relays preferably have additional contact pairs for use in a read-out circuit as later described.

Unit eliminator relays 125–1 through 125–12 are in effect interposed between the voltage distributor and the matrix positive terminals 120. As shown, each relay 125–*n* is connected in series with a diode 126 between the positive voltage distributor terminal D*n* and the negative voltage distributor of same *n* number and poled for positive current flow. A normally open contact *a* of each remainder relay 125 is inserted in series between each terminal D1 through D12 and the corresponding positive bus bar terminal +1 through +12 so that voltage distributor connections are not made to the positive bus bars until the representative remainder relay involved has been energized. A diode 127 is also connected between each contact pair 125a and the corresponding positive terminal 120 to block any possible positive current flow from a positive matrix terminal through a pair 125a when closed. A second contact 125b of each remainder relay is normally closed and connected between each terminal D$n$ and the next lower distributor terminal D($n-1$). A diode 128 in series with each contact pair 125b–1 through 125b–12 is poled for positive current flow only from higher numbered to lower numbered bus bars.

In operation when the voltage distributor applies a voltage between, for example, +D12 and —0, no voltage can be applied to positive bus bar 12 until relay 125–12 has been energized. If any partition of 12 is available as, for example, when the first $a_1$ of 4 (the particular example described in connection with FIG. 14), a path for energizing remainder relay 125–12 is provided, in the negative component matrix of the dual matrix of FIG. 14. Thus the current path may be traced from the voltage distributor terminal D12 through a diode 126 and the coil of relay 125–12, thence through negative bus bar —12 into the negative matrix, and (FIG. 14) through a diode 106 to the negative bust bar —8, through another diode 106 to negative bus bar —4 and finally through a third diode 106 to negative bus bar —0, which is the other terminal of the voltage distributor. The path through the negative matrix is that traced in heavy outline in FIG. 14.

So long as any partition is available through the low-impedance (essentially short circuit) paths provided by matrix diode cells, there is no remainder to be eliminated and the A-integer need not be changed. Accordingly, contact $a$ of relay 125–12 (i.e., contact 125$a$–12) closes to apply distributor voltage across the 12-span dual matrix by connecting terminal D12 to the positive bar 12 or bus bars 120 as desired. The priority relays 108–12, 108–8, and 108–4 in the FIG. 14 matrix are thereupon energized as dictated by the matrix logic and their priority contact pairs open the lower-rank extensions of the energized bus bars in the positive component matrix.

However, and it is here that the unit remainder relays perform their unique reprogramming function, there are many instances where the problem set up according to the random occurrence of defects establishes an unpartitionable value of A with the $a_1$ elements present in the matrix. One occurs when the A-span is larger than the smallest $a_1$. They may be established in two classes— when the unpartitionable A is (1) larger or (2) smaller than the smallest $a_1$ in the partitioning element set. The other is simply that the available A-span is smaller than the minimum $a_1$ in the matrix. Both can be illustrated with the simple 2-span matrix of FIG. 14 as provided with a single cell block in which $a_1$=4.

For the too-large A-span, there is always a solution, namely the limiting case where A is reduced to $a_1$. If this is the only partition available, the unit remainder circuit operation seeks it out. But the step-down or unit remainder eliminator action always stops at the higher partitionable A-span as desired. For example, if a defect were present only in the first strip or square of the 12-unit span, an A-span of 11 is established. The voltage distributor then applies a relay operating voltage between terminals D12 and —1 (FIG. 17). No path from terminal D12 exists except through normally closed remainder relay contacts 125b–12, 125b–11 and 225b–10 to terminal D9. Since a path exists through the 8-span negative matrix FIG. 14 between bus bars —9 and —1 (two $a_1$ links of 4), remainder relay 125–9 is energized and voltage would be applied to bus bar +9 for operation of the matrix priority relays 108–9 and 108–5 (FIG. 14). No voltage is applied to bus bars +12, +11, or +10 since remainder relays 125–12, 125–11 and 125–10 are not energized. Units 10, 11, and 12 are 3-unit remainders subtracted one-by-one from the intial A of 11 to arrive at a partitionable value of 8.

For the too-small A-span, the problem programmed is effectively withdrawn by stepping down the A number until it is eliminated. In physical fitting problems a remainder can be cut from a too-long piece element but cannot be added to a too-short piece. For example, an A of 3 is established between voltage distributor terminals D12 and —9 for a defect existing in the ninth unit strip or square. (This is also the voltage distribution illustrative example in FIGS. 8A, 8E, and 8F.) In partitioning sheet material, the strips represented by squares 9, 10, and 11 (in addition to defect strip 12) are discards or waste. No path through the $a_1$=4 links in the negative matrix FIG. 14 could possibly exist. Relay 125–12 is not energized; neither, in turn, are relays 125–11 nor 125–10. Relay 125–9, as the lowest relay in the A-span, is energized when the positive voltage is stepped down to terminal D9 through the normally closed $b$ contact pairs of these relays, but no bus bar span remains to be energized.

If desired, contact pairs from the remainder relays and the matrix priority relays may be variously employed to identify which integers or which unit strips are involved in partitioned A-spans. A complete and convenient read-out circuit is described in the next subsection.

G. *Automatic read-out system*

An automatic system is described in this subsection for transposing the identification of numbers involved in partitions into specific instructions for cutting sheet material in an automatic system. Such a system is especially desirable where the A-span is automatically programmed according to defect locations without regard to the availability of a partitioning solution. Performance of three functions is here described—(1) marking the boundaries of the partitioned spans, (2) marking the boundaries of each defect unit, and (3) additionally marking the boundaries of each remainder unit.

(1) *Marker relay circuits.*—Boundaries of each partition are indicated by marker relays 129–1 through 129–12. As shown in FIG. 17, each relay is connected between positive and negative bus bar terminals of the same number in series with a diode 130. Each diode permits relay-energizing current flow when its positive bar is at a positive potential to the negative one. It will be appreciated that the marker relay connections are the same as if they were shown interconnecting positive and negative matrix bus bars of the same number in the representations of the duel matrix in either FIG. 13 or 14. Accordingly, for each path in the positive and negative matrices through a matrix priority relay 108, a path also exists through the matrix marker relay 129 connected to the same positive bus bar as the priority relay. Since only the positive bus bars in the highest rank partition are energized in a multiple $a_1$-block matrix, marker relays are not required in each matrix cell block. One marker relay for each positive bus bar is sufficient for selective partitioning read-out and the usually inconvenient collection of read-out contacts from each priority relay in each cell block of a typical matrix is unnecessary.

The marker relay system also additionally marks, through its contact pairs, the lowermost positive bus bar in a partition. For example, employing the matrix of FIG. 14, as programmed for $a_1$=4, in the absence of defects the voltage of the distributor is automatically connected between positive terminal D12 and negative bus bar 12 in FIG. 17. As previously described, remainder relay 125–12 is energized through a negative matrix path and voltage is applied to positive bus bar 12. Marker relay 129–12 is accordingly energized in parallel with remainder relay 125–12. Since positive bus bars 8, 4 are also each energized with respect to the negative zero bus bar, the corresponding marker relays 129–8, 129–4 are also energized. All bus bar numbers bounding and dividing the three lengths in the partition are indicated by operation of contact pairs of the marker relays.

The operation of the automatic remainder relays to eliminate a programmed A-span too small to partition always results in energizing the lowermost remainder relay 125 in the span. This results, of course, in the closing of its *a* set of contacts and the energizing of the same-number marker relay. This number is, of course, that of a bus bar bounding the upper boundary of a defect strip as well as the lower boundary of a remainder strip, and the energized marker relay thus marks the lower boundary of a remainder strip.

It will be appreciated that the various diodes 127, 128, and 130 isolate the remainder and marker circuits with respect to each other and the dual matrix so far as unwanted or reverse paths are concerned.

(2) *Read-out circuits employing marker and defect relay contacts.*—As particularly shown in FIG. 18, cutting read-out relays 131 are selectively energized from any suitable energizing voltage bus 132 by the operation of relay contact pairs *e*, *f* of the respective defect switches 123 and contact pairs *a*, *b* of the marker relays 129. Each read-out relay 131–1 through 131–12 suitably actuates through one or more relay contact pairs one of a bank of slit cutters each located at a unit boundary or other indicator or control means. In this instance the relay sequence number corresponds to the bus bars. Thus to cut out the sixth defect square, relays 131–5 and 131–6 must be actuated; to divide the partition elements bounding the sixth bus bar, relay 131–6 is energized.

As further shown, each relay 131–*n* is operated by placing a potential across it with respect to its common or ground return connection. A normally open contact pair 129*a*–*n* of each marker relay closes a read-out relay energizing circuit when the marker relay itself is closed.

In order to cut out the remainder and defect strips unit by unit, a chain or ladder connection of additional marker defect relay contact pairs closes each read-out relays in unenergized bus bar spans not bounded by bus bars for which marker relays are energized. For this purpose each read-out relay coil 131–*n* is also connected in the energizing circuits of each adjacent read-out relay coil higher and lower in number through normally closed marker relay contact pairs 129*b*–*n* and 129*c*–*n* respectively. The contact pairs *b* and *c* of adjacent-number marker relays are not connected directly in series but instead are linked through a normally closed contact *e* of the higher-number bus bar defect relay 123. In the event that defect relay is closed, indicating the marker relays bound a defect strip, an alternate path for energizing the lower-number read-out relay is provided by additional connection of each marker relay contact pair *b* to the energizing voltage source through the closed (normally open) defect relay contact pair *f*. Read-out relay 131–12 is connected through marker relay normally closed contact pair 129–12*b* (i.e., 129*b*–12) directly to the relay energizing bus 132. This simulates a closed defect relay for a next higher (thirteenth) bus.

In operation, if no marker relays are energized to indicate the boundaries of partitions, the marker relay normally closed contact pairs *b* and *c* remain closed and each of the read-out relays 131–1 through 131–12 is energized. Translated as cutting instructions, a 12 unit strip of glass is to be cut, or, to be marked for cutting, into 12 strips. The energizing of adjacent-number read-out relays 131 is readily distinguished as not representing the energizing of adjacent number bus bars through $a_1$ cell links. Since $a_1$ values of one are normally waste, the unit length cuts are obviously recognizable and rejected.

Following through the example previously mentioned (see FIG. 8A) where defects occur in the first and ninth squares, and with the 12-span matrix system of FIGS. 17 and 14 programmed only for $a_1=4$, partitions are limited to a single span of four, and the remainder of the sheet should be chopped into unit lengths. Such a read-out is provided. The automatic reprogramming provided by the remainder relays causes marker relays 129–1 and 129–5 to be energized. Marker relay contacts 129*a*–1 and 129*a*–5 close to energize read-out relays 131–1 and 131–5. The opening of the normally closed marker relay contact pairs 129–5 *b* and *c* cuts read-out relays 131–1 through 131–5 out of the energized chain. It will be noted that the closing of the tenth unit defect relay 123–10 does not interrupt the chain of actuated read-out relays 131–12 down through 131–5.

While marker relay 129–9, representing the lowest bus bar in an initially programmed A-span, is energized to directly cause read-out relay to 131–9 to be actuated and open the chain of normally-closed marker relay contacts, the closing of defect relay contact pair 123*f*–9 assures the actuation of read-out relay 131–8 (the lower cut or boundary for the ninth unit) whether or not marker relay 129–8 is energized.

We claim as our invention:

1. Means for determining the presence of a selected one of a class of given integers in a partition of a given number which comprises a consecutively ordered array of terminals equal to said given number, diode spanning links connected between each set of terminals separated by a span equal to any of said class of integers, said links being poled for conduction from higher to lower ordered terminals, means for connecting a voltage source between terminals separated by a span equal to said number to provide a directional current flow through all linked paths between said terminals, and readout means for detecting current flow through a diode link representing the selected one of said class.

2. Means for determining the possible fit of members of a set of first given integers into a larger given integer which comprises a sequentially ordered array of conductors, unidirectionally conducting means for interconnecting each span of conductors in said array corresponding to each of said first integers, said means being poled for easy conduction from higher to lower ordered conductors, means for energizing a conductor span corresponding to said larger integer to provide directional current flow through all linked paths between said conductors, and means for detecting current paths through said unidirectional means.

3. A partitioning matrix having a plurality of bus bars in numbered sequence, means for connecting unidirectionally conducting cells across each matrix span equal to each partitioning element number, said cells being poled for easy conduction from higher to lower numbered bus bars, means for conducting a directional voltage between bus bars having a span equal to the number to be partitioned to establish a directional current flow through all linked paths between said bus bars, and means for detecting the presence of current in one of said cells.

4. A computer matrix for determining the possible fit of members of a set of given integers into a larger given integer comprising an array of conductors having a numerical order, unidirectionally conducting links spanning conductors whose numerical difference corresponds to any one of said integers of said set, said links being poled to conduct in a direction of diminishing numerical order, means for applying voltage between conductors whose numerical difference corresponds to said larger given integer, and means for detecting resulting current paths through one of said links to determine whether the integer corresponding to the link is an element of a possible fit.

5. A computer matrix for determining a preferred fit of members of a set of given integers ranked in a preferred order into a larger given integer comprising an array of numerically ordered conductors, unidirectionally conducting links connected between the pairs of conductors of numerical difference corresponding to each of different integers of said set, said links being poled to conduct from higher ordered to lower ordered conductors, means for applying voltage between conductors whose numerical difference corresponds to said larger integer, means for opening resulting current paths between conductors through links corresponding to lower rank integers when parallel current paths exist between the same conductors through links corresponding to higher rank integers, and means for detecting the resulting path through at least one of the links in the path to indicate the integer corresponding to the link as an element of the preferred fit.

6. A computing matrix for determining which ones of a set of selected integers are members of partitions of a given larger integer which comprises an array of numerically ordered conductors having a zero base conductor and with its further conductors corresponding to successive integers including the said larger given integer, a block of unidirectionally conducting links for each of said set of integers, each link of each block spanning a pair of conductors of numerical difference corresponding to the integer of that block, and each such link being poled to conduct from a higher to a lower ordered conductor, means for detecting in each block the passage of current through that link of the block which is connected to the zero conductor, and means for applying an electrical voltage between the zero base conductor and the conductor corresponding to said larger integer to provide directional current flow through all paths linked between said last two conductors.

7. A computing matrix for determining which ones of a set of smaller integers are members of a possible partition of a given larger integer which comprises an array of numerically ordered conductors starting with zero and including the said larger given integer, a plurality of blocks of unidirectionally conducting links, each block of links representing one integer of said set of smaller integers, each link in each block connected between conductors of numerical difference corresponding to the integer represented by that block, and all such links being poled to conduct in the same numerical direction among said ordered conductors, means for applying a voltage between the zero base conductor and the conductor corresponding to said larger integer to provide a directional current flow through all completed link paths between said conductors, and means for detecting the passage of current through selected ones of said links in each block to determine whether the integer represented by the link is a member of a partition of the given larger integer.

8. A computing matrix as in claim 7 having means responsive to the absence of current flow through the links for automatically reconnecting the voltage source across conductors differing one less in number than the previous connection in order to determine the next largest integer which can be partitioned.

9. A computing matrix as in claim 7 having a multiple disconnect switch set for each block of links, with a switch of a given switch set in each link of its associated link block whereby selected link blocks corresponding to selected ones of said set of smaller integers can be switched into or out of the integer set.

10. A computing matrix for determining which ones of a set of smaller integers can partition a given larger integer, comprising at least one array of numerically ordered conductors having a numerical difference at least as large as the said larger given integer, a plurality of blocks of unidirectionally conducting links, each block of links repesenting one integer of said set of smaller integers, each link in each block connected to conduct from a conductor of a given numerical order to a conductor of a lower numerical order, the numerical difference corresponding to the integer represented by that block, means for connecting a voltage source between conductors differing in number by said given larger integer to provide a directional current flow through all linked paths between said conductors, and means for indicating the presence or absence of current through links in said blocks to indicate whether the integer represented by the links is in a partition of the given larger integer.

11. In a partitioning matrix having an array of sequentially numbered busses for inter-connection by chains of unidirectionally conductive current responsive readout cells linking each pair of busses having a numerical difference equal to a partitioning set integer, at least one universal cell block comprising a plurality of readout cells each having one terminal connected to a respective one of said busses, a set of normally open switches corresponding to each partitioning set integer, the respective switches in each set having one terminal connected to the other terminal of a linking cell and each having the other terminal connected to a bus lower in number than the bus to which the said one terminal of the cell is connected by a number equal to the partitioning integer for that set of switches, and means for selectively closing the switches of one set to connect the cells for the corresponding integer into the matrix.

12. A selective partitioning matrix for determining which members of a set of ranked integers complete the highest rank partition of a larger integer, which comprises, an array of numerically ordered conductors whose numerical difference span includes said larger given integer, a plurality of blocks of unidirectionally conducting links, each block of links representing one of said set of selected integers and each link in each block connected to conduct from a conductor of a given numerical order to a conductor of a lower numerical order, the numerical difference between said conductors corresponding to the integer represented by that block, means for connecting a voltage source between conductors whose numerical difference span corresponds to said larger integer to provide a directional current flow through all links in partitioning paths between said conductors, current responsive means in at least some of the links for indicating which members of said set of selected integers are present in partitions, and switching means for disconnecting portions of the matrix conductors carrying links corresponding to lower ranked integers when current flows through links corresponding to higher ranked integers connected to other portions of the same matrix conductors.

13. A matrix as in claim 12 in which the current responsive means are relay coils for actuating said switching means.

14. A matrix as in claim 12 having means for automatically progressively reconnecting the voltage source between conductors having a numerical difference span smaller by one in the event no current flows through any links in order to determine the least remainder if said larger integer cannot be exactly partitioned by members of said set of ranked integers.

15. Apparatus for determining the highest ranking members of a set of ranked integers which can partition a given larger integer comprising
 (a) first and second arrays of numerically ordered conductors whose combined numerical difference span includes said larger integer,
 (b) said first array of conductors being segmented with successive columns of segments representing the successively lower ranked integers of said set,
 (c) first, second, and third series of blocks of unidirectionally conducting links
  (1) successive blocks in the respective series corresponding to successively lower ranked integers of said set,
  (2) links in a given block being connected between conductors differing in number by that block's corresponding integer and poled for easy conduction from the higher to the lower numbered conductor, (3) links of a given block of said first series being connected between conductor segments of said first array representing the integer corresponding to said block, (4) links of a given block of said second series being connected between conductors of said second array, and (5) links of a given block of said third series being connected between conductors of said second array and conductor segments of said first array representing the integer corresponding to said block, (d) means for connecting a voltage source between a first array conductor segment of the highest integer column and a second array conductor, said conductor and said segment differing in number by the larger integer, and said source being poled to establish partitioning current paths through all continuous unidirectional chains of links between said conductor and said segment, (e) actuating means in at least one link of each said third series block responsive to current therethrough for indicating the presence in a partition of the integer corresponding to that block and (f) means for eliminating indication of partitions by low-ranking integers which comprises disconnect switches between adjacent conductor segments of said first array, each operable by the actuating means in the link connected to one of the conductor segments in the higher priority column in response to the flow of partitioning current through the link.

References Cited by the Examiner

UNITED STATES PATENTS

| | | | |
|---|---|---|---|
| 2,934,273 | 4/1960 | Elmore et al. | 235—185 |
| 3,015,697 | 1/1962 | Klinkhamer. | |
| 3,017,613 | 1/1962 | Miller | 340—173 |
| 3,060,420 | 10/1962 | Brink | 340—347 |
| 3,089,126 | 5/1963 | Miller | 340—173 |
| 3,105,957 | 10/1963 | Li | 340—173 |

MALCOLM A. MORRISON, *Primary Examiner.*

K. W. DOBYNS, *Assistant Examiner.*